US012270386B2

(12) United States Patent
Rowe et al.

(10) Patent No.: US 12,270,386 B2
(45) Date of Patent: Apr. 8, 2025

(54) SHAPE MEMORY MATERIAL MEMBER-BASED ACTUATOR

(71) Applicant: Toyota Motor Engineering & Manufacturing North America, Inc., Plano, TX (US)

(72) Inventors: Michael Paul Rowe, Pinckney, MI (US); Brian J. Pinkelman, Ann Arbor, MI (US); Yufei Zhu, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/329,217

(22) Filed: Jun. 5, 2023

(65) Prior Publication Data

US 2024/0280089 A1    Aug. 22, 2024

Related U.S. Application Data

(60) Provisional application No. 63/485,398, filed on Feb. 16, 2023.

(51) Int. Cl.
    *F03G 7/06*    (2006.01)
(52) U.S. Cl.
    CPC ............................... *F03G 7/06143* (2021.08)
(58) Field of Classification Search
    CPC ................................................... F03G 7/06143
    USPC .................................................. 60/527–529
    See application file for complete search history.

(56) References Cited

U.S. PATENT DOCUMENTS

| 1,658,669 | A | 2/1928 | Cohn et al. |
| 2,322,755 | A | 6/1943 | Voorhies |
| 2,588,706 | A | 3/1952 | Davis |
| 3,394,631 | A | 7/1968 | Thompson |
| 3,706,102 | A | 12/1972 | Grenier |
| 4,063,826 | A | 12/1977 | Riepe |

(Continued)

FOREIGN PATENT DOCUMENTS

| CN | 201037277 | | 3/2008 |
| CN | 101367433 | A | 2/2009 |

(Continued)

OTHER PUBLICATIONS

Zhu et al., U.S. Appl. No. 18/172,637, filed Feb. 22, 2023.

(Continued)

*Primary Examiner* — Hoang M Nguyen
(74) *Attorney, Agent, or Firm* — Christopher G. Darrow; Darrow Mustafa PC

(57) ABSTRACT

An actuator can include one or more shape memory material members. When an activation input is provided to the one or more shape memory material members, the one or more shape memory material members contract, which causes the actuator to morph into an activated configuration. A height of the actuator increases in the activated configuration. The actuator can include a first outer body member and a second outer body member. The first outer body member can include a first portion and a second portion pivotably connected to each other. One or more processors can be operatively connected to selectively activate the one or more shape memory material members.

25 Claims, 15 Drawing Sheets

(56) References Cited

U.S. PATENT DOCUMENTS

| | | | |
|---|---|---|---|
| 4,244,140 A | 1/1981 | Kim |
| 4,396,220 A | 8/1983 | Dieckmann et al. |
| 4,498,851 A | 2/1985 | Kolm et al. |
| 4,522,447 A | 6/1985 | Snyder et al. |
| 4,541,885 A | 9/1985 | Caudill, Jr. |
| 4,544,988 A | 10/1985 | Hochstein |
| 4,553,393 A | 11/1985 | Ruoff |
| 4,595,338 A | 6/1986 | Kolm et al. |
| 4,779,852 A | 10/1988 | Wassell |
| 4,780,062 A | 10/1988 | Yamada et al. |
| 4,806,815 A | 2/1989 | Homma |
| 4,811,564 A | 3/1989 | Palmer |
| 4,834,619 A | 5/1989 | Walton |
| 4,898,426 A | 2/1990 | Schulz et al. |
| 4,923,000 A | 5/1990 | Nelson |
| 4,944,755 A | 7/1990 | Hennequin et al. |
| 4,955,196 A | 9/1990 | Lin et al. |
| 4,964,402 A | 10/1990 | Grim et al. |
| 5,069,219 A | 12/1991 | Knoblich |
| 5,088,115 A | 2/1992 | Napolitano |
| 5,129,753 A | 7/1992 | Wesley et al. |
| 5,250,167 A | 10/1993 | Adolf et al. |
| 5,255,390 A | 10/1993 | Gross et al. |
| 5,279,123 A | 1/1994 | Wechsler et al. |
| 5,482,351 A | 1/1996 | Young et al. |
| 5,488,255 A | 1/1996 | Sato et al. |
| 5,522,712 A | 6/1996 | Winn |
| 5,583,844 A | 12/1996 | Wolf et al. |
| 5,619,177 A | 4/1997 | Johnson et al. |
| 5,622,482 A | 4/1997 | Lee |
| 5,662,376 A | 9/1997 | Breuer et al. |
| 5,678,247 A | 10/1997 | Vickers |
| 5,686,003 A | 11/1997 | Ingram et al. |
| 5,747,140 A | 5/1998 | Heerklotz |
| 5,771,742 A | 6/1998 | Bokaie et al. |
| 5,846,629 A | 12/1998 | Gwinn |
| 5,853,005 A | 12/1998 | Scanlon |
| 5,861,703 A | 1/1999 | Losinski |
| 6,043,978 A | 3/2000 | Mody et al. |
| 6,053,553 A | 4/2000 | Hespelt |
| 6,093,910 A | 7/2000 | McClintock et al. |
| 6,116,257 A | 9/2000 | Yokota et al. |
| 6,142,563 A | 11/2000 | Townsend et al. |
| 6,155,716 A | 12/2000 | Okamura |
| 6,186,047 B1 | 2/2001 | Baruffaldi |
| 6,227,515 B1 | 5/2001 | Broyles |
| 6,379,393 B1 | 4/2002 | Mavroidis et al. |
| 6,394,001 B1 | 5/2002 | Giesey et al. |
| 6,404,098 B1 | 6/2002 | Kayama et al. |
| 6,422,010 B1 | 7/2002 | Julien |
| 6,443,524 B1 | 9/2002 | Yu |
| 6,481,799 B1 | 11/2002 | Whalen |
| 6,508,437 B1 | 1/2003 | Davis et al. |
| 6,530,217 B1 | 3/2003 | Yokota et al. |
| 6,546,806 B1 | 4/2003 | Varma |
| 6,591,188 B1 | 7/2003 | Ohler |
| 6,628,522 B2 | 9/2003 | Trautman et al. |
| 6,664,718 B2 | 12/2003 | Perline et al. |
| 6,719,694 B2 | 4/2004 | Weng et al. |
| 6,740,994 B2 | 5/2004 | Lee et al. |
| 6,773,535 B1 | 8/2004 | Wetzel |
| 6,809,462 B2 | 10/2004 | Pelrine et al. |
| 6,896,324 B1 | 5/2005 | Kull et al. |
| 6,910,714 B2 | 6/2005 | Browne et al. |
| 6,912,748 B2 | 7/2005 | VanSickle |
| 6,943,653 B2 | 9/2005 | Hanke et al. |
| 6,972,659 B2 | 12/2005 | von Behrens et al. |
| 6,998,546 B1 | 2/2006 | Schmidt et al. |
| 7,017,345 B2 | 3/2006 | Von Behrens et al. |
| 7,086,322 B2 | 8/2006 | Schulz |
| 7,093,903 B2 | 8/2006 | O'Connor et al. |
| 7,100,990 B2 | 9/2006 | Kimura et al. |
| 7,108,316 B2 | 9/2006 | Barvosa-Carter et al. |
| 7,117,673 B2 | 10/2006 | Szilagyi |
| 7,125,077 B2 | 10/2006 | Frank |
| 7,204,472 B2 | 4/2007 | Jones et al. |
| 7,237,847 B2 | 7/2007 | Hancock et al. |
| 7,256,518 B2 | 8/2007 | Gummin |
| 7,293,836 B2 | 11/2007 | Browne et al. |
| 7,306,187 B2 | 12/2007 | Lavan |
| 7,309,104 B2 | 12/2007 | Browne et al. |
| 7,331,616 B2 | 2/2008 | Brei et al. |
| 7,336,486 B2 | 2/2008 | Mongia |
| 7,350,851 B2 | 4/2008 | Barvosa-Carter et al. |
| 7,364,211 B2 | 4/2008 | Niskanen et al. |
| 7,371,052 B2 | 5/2008 | Koeneman |
| 7,446,450 B2 | 11/2008 | Boland et al. |
| 7,448,678 B2 | 11/2008 | Browne et al. |
| 7,476,224 B2 | 1/2009 | Petrakis |
| 7,478,845 B2 | 1/2009 | Mankame et al. |
| 7,484,735 B2 | 2/2009 | Verbrugge et al. |
| 7,501,607 B2 | 3/2009 | Camm et al. |
| 7,506,937 B2 | 3/2009 | Bequet |
| 7,511,402 B2 | 3/2009 | Ito et al. |
| 7,527,312 B1 | 5/2009 | Cucknell et al. |
| 7,556,313 B2 | 7/2009 | Browne et al. |
| 7,578,661 B2 | 8/2009 | Koeneman |
| 7,594,697 B2 | 9/2009 | Browne et al. |
| 7,619,894 B2 | 11/2009 | Wang et al. |
| 7,661,764 B2 | 2/2010 | Ali et al. |
| 7,709,995 B2 | 5/2010 | Hanlon et al. |
| 7,717,520 B2 | 5/2010 | Boren et al. |
| 7,729,828 B2 | 6/2010 | Gandhi |
| 7,731,279 B2 | 6/2010 | Asada et al. |
| 7,735,940 B2 | 6/2010 | Chiu |
| 7,756,246 B2 | 7/2010 | Mikami et al. |
| 7,758,121 B2 | 7/2010 | Browne et al. |
| 7,766,423 B2 | 8/2010 | Alexander et al. |
| 7,770,391 B2 * | 8/2010 | Melz ................ F03G 7/065 60/527 |
| 7,814,810 B2 | 10/2010 | Mitteer |
| 7,823,382 B2 | 11/2010 | Ukpai et al. |
| 7,823,972 B2 | 11/2010 | Browne et al. |
| 7,834,527 B2 | 11/2010 | Rivera et al. |
| 7,878,459 B2 | 2/2011 | Mabe et al. |
| 7,883,148 B2 | 2/2011 | Alexander et al. |
| 7,892,630 B1 | 2/2011 | McKnight et al. |
| 7,901,524 B1 | 3/2011 | McKnight et al. |
| 7,905,538 B2 | 3/2011 | Ukpai et al. |
| 7,905,547 B2 | 3/2011 | Lawall et al. |
| 7,909,403 B2 | 3/2011 | Lawall et al. |
| 7,964,290 B2 | 6/2011 | Mullner et al. |
| 7,965,509 B2 | 6/2011 | Campbell et al. |
| 7,971,296 B2 | 7/2011 | Jansen |
| 7,971,939 B2 | 7/2011 | Fujita et al. |
| 8,016,952 B2 | 9/2011 | Ishida et al. |
| 8,038,215 B2 | 10/2011 | Di Gusto et al. |
| 8,052,112 B2 | 11/2011 | Lawall et al. |
| 8,056,335 B1 | 11/2011 | Brown |
| 8,100,471 B2 | 1/2012 | Lawall et al. |
| 8,109,567 B2 | 2/2012 | Alexander et al. |
| 8,126,615 B2 | 2/2012 | McMillen et al. |
| 8,172,458 B2 | 5/2012 | Petrakis |
| 8,240,677 B2 | 8/2012 | Browne et al. |
| 8,313,108 B2 | 11/2012 | Ac et al. |
| 8,362,882 B2 | 1/2013 | Heubel et al. |
| 8,366,057 B2 | 2/2013 | Vos et al. |
| 8,414,366 B2 | 4/2013 | Browne et al. |
| 8,446,475 B2 | 5/2013 | Topliss et al. |
| 8,448,435 B2 | 5/2013 | Gregory et al. |
| 8,510,924 B2 | 8/2013 | Mankame et al. |
| 8,584,456 B1 | 11/2013 | McKnight |
| 8,585,456 B2 | 11/2013 | Canon |
| 8,593,568 B2 | 11/2013 | Topliss et al. |
| 8,649,242 B2 | 2/2014 | Martin et al. |
| 8,681,496 B2 | 3/2014 | Dede |
| 8,695,334 B2 | 4/2014 | Lewis et al. |
| 8,702,120 B2 | 4/2014 | Kalisz et al. |
| 8,721,557 B2 | 5/2014 | Chen et al. |
| 8,741,076 B2 | 6/2014 | Gao et al. |
| 8,756,933 B2 | 6/2014 | Topliss et al. |
| 8,793,821 B2 | 8/2014 | Fowkes et al. |
| 8,827,709 B1 | 9/2014 | Gurule et al. |
| 8,830,335 B2 | 9/2014 | Topliss et al. |

(56) References Cited

U.S. PATENT DOCUMENTS

| | | |
|---|---|---|
| 8,853,916 B2 | 10/2014 | Browne et al. |
| 8,880,141 B2 | 11/2014 | Chen |
| 8,881,347 B2 | 11/2014 | Feinstein |
| 8,894,142 B2 | 11/2014 | Alexander et al. |
| 8,912,709 B2 | 12/2014 | Pollock et al. |
| 8,991,769 B2 | 3/2015 | Gandhi |
| 8,998,320 B2 | 4/2015 | Mankame et al. |
| 9,068,561 B2 | 6/2015 | Gondo |
| 9,086,069 B2 | 7/2015 | Dede |
| 9,140,243 B2 | 9/2015 | Gandhi et al. |
| 9,168,814 B2 | 10/2015 | Gandhi |
| 9,171,686 B2 | 10/2015 | Alacqua et al. |
| 9,180,525 B2 | 11/2015 | Park et al. |
| 9,267,495 B2 | 2/2016 | Kopfer et al. |
| 9,298,207 B2 | 3/2016 | Li |
| 9,347,609 B2 | 5/2016 | Pinto, IV et al. |
| 9,428,088 B1 | 8/2016 | Rajasingham |
| 9,457,813 B2 | 10/2016 | Hoerwick et al. |
| 9,457,887 B2 | 10/2016 | Roe et al. |
| 9,495,875 B2 | 11/2016 | Dowdall et al. |
| 9,512,829 B2 | 12/2016 | Alacqua et al. |
| 9,550,466 B2 | 1/2017 | Gandhi |
| 9,588,020 B2 | 3/2017 | Browne et al. |
| 9,662,197 B2 | 5/2017 | Yun et al. |
| 9,664,182 B2 | 5/2017 | Nicolini et al. |
| 9,664,210 B2 | 5/2017 | Ou et al. |
| 9,684,183 B2 | 6/2017 | Brown et al. |
| 9,696,175 B2 | 7/2017 | Hansen et al. |
| 9,697,708 B2 | 7/2017 | Adrezin et al. |
| 9,714,460 B2 | 7/2017 | Merideth |
| 9,719,534 B2 | 8/2017 | Shevchenko et al. |
| 9,731,828 B2 | 8/2017 | Lichota |
| 9,764,220 B2 | 9/2017 | Keating et al. |
| 9,784,249 B2 | 10/2017 | Li et al. |
| 9,784,590 B2 | 10/2017 | Englehardt et al. |
| 9,827,888 B2 | 11/2017 | Patrick et al. |
| 9,848,814 B2 | 12/2017 | Benson et al. |
| 9,943,437 B2 | 4/2018 | Lowe et al. |
| 9,945,490 B2 | 4/2018 | Dankbaar et al. |
| 9,981,421 B2 | 5/2018 | Macroe et al. |
| 9,994,136 B2 | 6/2018 | Nakada |
| 10,007,263 B1 | 6/2018 | Fields et al. |
| 10,029,618 B2 | 7/2018 | Perez Astudillo et al. |
| 10,059,334 B1 | 8/2018 | Zhu et al. |
| 10,061,350 B2 | 8/2018 | Magi |
| 10,066,829 B2 | 9/2018 | Wong et al. |
| 10,168,782 B1 | 1/2019 | Tchon et al. |
| 10,191,550 B1 | 1/2019 | Nussbaum et al. |
| 10,208,823 B2 | 2/2019 | Kashani |
| 10,299,520 B1 | 5/2019 | Shaffer et al. |
| 10,302,586 B2 | 5/2019 | Sun et al. |
| 10,315,771 B1 | 6/2019 | Rao et al. |
| 10,330,144 B1 | 6/2019 | Alqasimi et al. |
| 10,330,400 B2 | 6/2019 | Dede |
| 10,335,044 B2 | 7/2019 | Banet et al. |
| 10,349,543 B2 | 7/2019 | Sreetharan et al. |
| 10,355,624 B2 | 7/2019 | Majdi et al. |
| 10,371,229 B2 | 8/2019 | Gandhi et al. |
| 10,371,299 B2 | 8/2019 | Leffler |
| 10,377,278 B2 | 8/2019 | Ketels et al. |
| 10,427,634 B2 | 10/2019 | Gandhi et al. |
| 10,434,973 B2 | 10/2019 | Gandhi et al. |
| 10,441,491 B2 | 10/2019 | Wyatt et al. |
| 10,459,475 B2 | 10/2019 | Gandhi et al. |
| 10,479,246 B2 | 11/2019 | Meingast et al. |
| 10,532,672 B1 | 1/2020 | Pinkelman et al. |
| 10,583,757 B2 | 3/2020 | Ketels et al. |
| 10,591,078 B2 | 3/2020 | Oehler et al. |
| 10,647,237 B2 | 5/2020 | Song |
| 10,677,310 B2 | 6/2020 | Gandhi et al. |
| 10,682,931 B2 | 6/2020 | Rowe et al. |
| 10,759,320 B2 | 9/2020 | Mochizuki |
| 10,773,487 B2 | 9/2020 | Frigerio et al. |
| 10,781,800 B2 | 9/2020 | Brown et al. |
| 10,814,514 B2 | 10/2020 | Aihara |
| 10,843,611 B2 | 11/2020 | Caruss et al. |
| 10,933,974 B2 | 3/2021 | Tsuruta et al. |
| 10,960,793 B2 | 3/2021 | Gandhi et al. |
| 10,965,172 B2 | 3/2021 | Dede et al. |
| 10,993,526 B2 | 5/2021 | Vandewall et al. |
| 10,995,779 B2 | 5/2021 | Keplinger et al. |
| 11,048,329 B1 | 6/2021 | Lee et al. |
| 11,091,060 B2 | 8/2021 | Pinkelman et al. |
| 11,125,248 B2 | 9/2021 | Joshi et al. |
| 11,137,045 B2 | 10/2021 | Gandhi et al. |
| 11,180,052 B2 | 11/2021 | Severgnini et al. |
| 11,241,842 B2 | 2/2022 | Gandhi et al. |
| 11,247,584 B2 | 2/2022 | Breitweg et al. |
| 11,248,592 B1 | 2/2022 | Tsuruta et al. |
| 11,269,891 B2 | 3/2022 | Frank et al. |
| 11,285,844 B2 | 3/2022 | Gandhi et al. |
| 11,353,009 B1 | 6/2022 | Rowe et al. |
| 11,356,255 B1 | 6/2022 | Emelyanov et al. |
| 11,370,330 B2 | 6/2022 | Gandhi et al. |
| 11,372,481 B2 | 6/2022 | Leroy et al. |
| 11,377,007 B2 | 7/2022 | Samain et al. |
| 11,458,874 B2 | 10/2022 | Nagai et al. |
| 11,460,009 B1 | 10/2022 | Tsuruta et al. |
| 11,460,010 B1 | 10/2022 | Tsuruta et al. |
| 11,467,669 B2 | 10/2022 | Liu et al. |
| 11,472,325 B1 | 10/2022 | Tsuruta et al. |
| 11,486,421 B2 | 11/2022 | Keplinger et al. |
| 11,536,255 B1 | 12/2022 | Rowe |
| 11,542,925 B1 | 1/2023 | Rowe et al. |
| 11,577,471 B2 | 2/2023 | Gandhi et al. |
| 11,591,076 B2 | 2/2023 | Song et al. |
| 11,592,010 B1 | 2/2023 | Panwar et al. |
| 11,592,037 B1 | 2/2023 | Rowe et al. |
| 11,603,153 B1 | 3/2023 | Trager et al. |
| 11,603,828 B2 | 3/2023 | Gummin et al. |
| 11,624,376 B2 | 4/2023 | Rowe et al. |
| 11,628,898 B1 | 4/2023 | Trager et al. |
| 11,642,083 B2 | 5/2023 | Severgnini et al. |
| 11,649,808 B2 | 5/2023 | Tsuruta et al. |
| 11,668,287 B2 | 6/2023 | Naly et al. |
| 11,702,015 B2 | 7/2023 | Pinkelman et al. |
| 11,732,735 B2 | 8/2023 | Song et al. |
| 11,750,115 B2 | 9/2023 | Saneyoshi et al. |
| 11,752,901 B2 | 9/2023 | Gandhi et al. |
| 11,795,924 B2 | 10/2023 | Rowe |
| 11,840,161 B2 | 12/2023 | Schmalenberg et al. |
| 11,841,008 B1 | 12/2023 | Panwar et al. |
| 11,885,428 B2 | 1/2024 | Panwar et al. |
| 11,897,379 B2 | 2/2024 | Tsuruta et al. |
| 11,913,436 B2 | 2/2024 | Easton et al. |
| 11,927,206 B2 | 3/2024 | Rowe et al. |
| 2002/0130754 A1 | 9/2002 | Alacqua et al. |
| 2002/0179663 A1 | 12/2002 | Moore et al. |
| 2003/0000605 A1 | 1/2003 | Homma |
| 2003/0182041 A1 | 9/2003 | Watson |
| 2004/0035108 A1 | 2/2004 | Szilagyi |
| 2004/0041998 A1 | 3/2004 | Haddad |
| 2004/0104580 A1 | 6/2004 | Spiessl et al. |
| 2004/0118854 A1 | 6/2004 | Kutun |
| 2004/0145230 A1 | 7/2004 | Fujita et al. |
| 2004/0195888 A1 | 10/2004 | Frye |
| 2004/0256920 A1 | 12/2004 | Gummin et al. |
| 2004/0261411 A1 | 12/2004 | MacGregor |
| 2005/0023086 A1 | 2/2005 | Szilagyi |
| 2005/0066810 A1 | 3/2005 | Schulz |
| 2005/0082897 A1 | 4/2005 | Ropp et al. |
| 2005/0111177 A1 | 5/2005 | Kwitek |
| 2005/0146147 A1 | 7/2005 | Niskanen et al. |
| 2005/0198904 A1 | 9/2005 | Browne et al. |
| 2005/0199455 A1 | 9/2005 | Browne et al. |
| 2005/0199845 A1 | 9/2005 | Jones et al. |
| 2005/0206096 A1 | 9/2005 | Browne et al. |
| 2005/0210874 A1 | 9/2005 | Browne et al. |
| 2005/0211198 A1 | 9/2005 | Froeschle et al. |
| 2005/0227607 A1 | 10/2005 | Stevenson et al. |
| 2005/0253425 A1 | 11/2005 | Asada et al. |
| 2006/0033312 A1 | 2/2006 | Barvosa-Carter et al. |
| 2006/0038643 A1 | 2/2006 | Xu et al. |
| 2006/0038745 A1 | 2/2006 | Naksen et al. |

(56) References Cited

U.S. PATENT DOCUMENTS

| | | |
|---|---|---|
| 2006/0074325 A1 | 4/2006 | Karo et al. |
| 2006/0201149 A1 | 9/2006 | Biggs et al. |
| 2006/0223637 A1 | 10/2006 | Rosenberg |
| 2006/0226013 A1 | 10/2006 | Decre et al. |
| 2006/0244293 A1 | 11/2006 | Buffa |
| 2006/0265965 A1 | 11/2006 | Butera et al. |
| 2007/0025575 A1 | 2/2007 | Oser et al. |
| 2007/0046074 A1 | 3/2007 | Satta et al. |
| 2007/0063566 A1 | 3/2007 | Browne et al. |
| 2007/0084220 A1 | 4/2007 | Asada et al. |
| 2007/0188004 A1 | 8/2007 | Browne et al. |
| 2007/0205853 A1 | 9/2007 | Taya et al. |
| 2007/0236071 A1 | 10/2007 | Fujita et al. |
| 2007/0246285 A1 | 10/2007 | Browne et al. |
| 2007/0246898 A1 | 10/2007 | Keefe et al. |
| 2007/0246979 A1 | 10/2007 | Browne et al. |
| 2007/0271939 A1 | 11/2007 | Ichigaya |
| 2007/0277877 A1 | 12/2007 | Ghorbal et al. |
| 2008/0006353 A1 | 1/2008 | Elzey et al. |
| 2008/0018198 A1 | 1/2008 | Sohn et al. |
| 2008/0085436 A1 | 4/2008 | Langan et al. |
| 2008/0100118 A1 | 5/2008 | Young et al. |
| 2008/0114218 A1 | 5/2008 | Suyama et al. |
| 2008/0219501 A1 | 9/2008 | Matsumoto |
| 2008/0267770 A1 | 10/2008 | Webster et al. |
| 2008/0271559 A1 | 11/2008 | Garscha et al. |
| 2008/0272259 A1 | 11/2008 | Zavattieri et al. |
| 2008/0307786 A1 | 12/2008 | Hafez et al. |
| 2009/0008973 A1 | 1/2009 | Browne |
| 2009/0009656 A1 | 1/2009 | Honda et al. |
| 2009/0030576 A1 | 1/2009 | Periot et al. |
| 2009/0041085 A1 | 2/2009 | Petrakis |
| 2009/0108607 A1 | 4/2009 | Browne et al. |
| 2009/0115284 A1 | 5/2009 | Liang et al. |
| 2009/0131752 A1 | 5/2009 | Park |
| 2009/0143730 A1 | 6/2009 | De Polo et al. |
| 2009/0173305 A1* | 7/2009 | Alexander ............ F02B 27/005 60/527 |
| 2009/0212158 A1 | 8/2009 | Mabe et al. |
| 2009/0218858 A1 | 9/2009 | Lawall et al. |
| 2009/0224584 A1 | 9/2009 | Lawall et al. |
| 2009/0224587 A1 | 9/2009 | Lawall et al. |
| 2009/0241537 A1 | 10/2009 | Browne et al. |
| 2009/0242285 A1 | 10/2009 | Whetstone, Jr. |
| 2009/0283643 A1 | 11/2009 | Sar et al. |
| 2009/0284059 A1 | 11/2009 | Gupta et al. |
| 2010/0001568 A1 | 1/2010 | Trybus et al. |
| 2010/0027119 A1 | 2/2010 | Kollar et al. |
| 2010/0031525 A1 | 2/2010 | Allezy et al. |
| 2010/0036567 A1 | 2/2010 | Gandhi |
| 2010/0066142 A1 | 3/2010 | Gross et al. |
| 2010/0117663 A1 | 5/2010 | Herrera et al. |
| 2010/0192567 A1 | 8/2010 | Butera |
| 2010/0212312 A1 | 8/2010 | Rudduck |
| 2010/0221124 A1 | 9/2010 | Ikushima et al. |
| 2010/0244505 A1 | 9/2010 | Demick et al. |
| 2010/0275592 A1 | 11/2010 | Topliss et al. |
| 2010/0282902 A1 | 11/2010 | Rajasingham |
| 2010/0287965 A1 | 11/2010 | Bryant |
| 2010/0294476 A1 | 11/2010 | Gomi et al. |
| 2010/0308689 A1* | 12/2010 | Rahman ............ F03G 7/06145 60/527 |
| 2010/0326070 A1 | 12/2010 | Hao et al. |
| 2011/0021932 A1 | 1/2011 | Kim et al. |
| 2011/0030380 A1 | 2/2011 | Widdle, Jr. et al. |
| 2011/0038727 A1 | 2/2011 | Vos et al. |
| 2011/0111839 A1 | 5/2011 | Lesley et al. |
| 2011/0120119 A1 | 5/2011 | Alexander et al. |
| 2011/0150669 A1 | 6/2011 | Frayne et al. |
| 2011/0179790 A1 | 7/2011 | Pretorius |
| 2011/0217031 A1 | 9/2011 | Eromaki |
| 2011/0300358 A1 | 12/2011 | Blohowiak et al. |
| 2012/0019216 A1 | 1/2012 | Lewis et al. |
| 2012/0049095 A1 | 3/2012 | Yamasaki |
| 2012/0056459 A1 | 3/2012 | Harden |
| 2012/0081337 A1 | 4/2012 | Camp, Jr. et al. |
| 2012/0109025 A1 | 5/2012 | Weinberg et al. |
| 2012/0136126 A1 | 5/2012 | Rousseau |
| 2012/0181896 A1 | 7/2012 | Kornbluh et al. |
| 2012/0232783 A1 | 9/2012 | Calkins et al. |
| 2012/0237309 A1 | 9/2012 | Park et al. |
| 2012/0239183 A1 | 9/2012 | Mankame et al. |
| 2012/0267928 A1 | 10/2012 | Mankame et al. |
| 2012/0276807 A1 | 11/2012 | Cabrera |
| 2012/0292155 A1 | 11/2012 | Gunter |
| 2012/0297763 A1 | 11/2012 | Mankame et al. |
| 2012/0319445 A1 | 12/2012 | Zolno et al. |
| 2013/0005442 A1 | 1/2013 | Erickson et al. |
| 2013/0011806 A1 | 1/2013 | Gao et al. |
| 2013/0043354 A1 | 2/2013 | Shome et al. |
| 2013/0075210 A1 | 3/2013 | Langbein et al. |
| 2013/0098029 A1 | 4/2013 | Pinto, IV et al. |
| 2013/0188313 A1 | 7/2013 | Dede |
| 2013/0205770 A1 | 8/2013 | Browne et al. |
| 2013/0227943 A1 | 9/2013 | Mance et al. |
| 2014/0130491 A1 | 5/2014 | Gandhi et al. |
| 2014/0168894 A1 | 6/2014 | Dede |
| 2014/0196633 A1 | 7/2014 | Shaw |
| 2014/0207333 A1 | 7/2014 | Vandivier et al. |
| 2014/0217792 A1 | 8/2014 | Meyer |
| 2014/0239677 A1 | 8/2014 | Laib et al. |
| 2014/0250881 A1 | 9/2014 | Yamamoto |
| 2014/0265468 A1 | 9/2014 | Greenhill et al. |
| 2014/0265479 A1 | 9/2014 | Bennett |
| 2014/0277739 A1 | 9/2014 | Kornbluh |
| 2014/0298794 A1 | 10/2014 | Flaschentrager et al. |
| 2014/0314976 A1 | 10/2014 | Niiyama et al. |
| 2014/0316269 A1 | 10/2014 | Zhang et al. |
| 2014/0333088 A1 | 11/2014 | Lang et al. |
| 2014/0338324 A1 | 11/2014 | Jasklowski |
| 2015/0016968 A1 | 1/2015 | Grabowska et al. |
| 2015/0130220 A1 | 5/2015 | Preisler et al. |
| 2015/0185764 A1 | 7/2015 | Magi |
| 2015/0197173 A1 | 7/2015 | Hulway |
| 2015/0202993 A1 | 7/2015 | Mankame et al. |
| 2015/0274078 A1 | 10/2015 | Alacqua et al. |
| 2015/0289994 A1 | 10/2015 | Engeberg et al. |
| 2015/0290015 A1 | 10/2015 | Elahinia et al. |
| 2015/0331488 A1 | 11/2015 | Grant et al. |
| 2015/0366350 A1 | 12/2015 | DiCenso et al. |
| 2016/0004298 A1 | 1/2016 | Mazed et al. |
| 2016/0032997 A1 | 2/2016 | Seepersad et al. |
| 2016/0061345 A1 | 3/2016 | Jackson, Jr. |
| 2016/0082984 A1 | 3/2016 | Schmidt |
| 2016/0084665 A1 | 3/2016 | Englehardt et al. |
| 2016/0123793 A1 | 5/2016 | Kollich et al. |
| 2016/0221475 A1 | 8/2016 | Sugiyama |
| 2016/0246374 A1 | 8/2016 | Carter et al. |
| 2016/0278459 A1 | 9/2016 | Hilty |
| 2016/0325837 A1 | 11/2016 | Erhel et al. |
| 2016/0345088 A1 | 11/2016 | Vilermo et al. |
| 2016/0375835 A1 | 12/2016 | Murray et al. |
| 2017/0116792 A1 | 4/2017 | Jelinek et al. |
| 2017/0121068 A1 | 5/2017 | Foshansky et al. |
| 2017/0123499 A1 | 5/2017 | Eid |
| 2017/0148102 A1 | 5/2017 | Franke et al. |
| 2017/0153707 A1 | 6/2017 | Subramanian et al. |
| 2017/0158104 A1 | 6/2017 | Le et al. |
| 2017/0166222 A1 | 6/2017 | James |
| 2017/0174236 A1 | 6/2017 | Worden et al. |
| 2017/0203432 A1 | 7/2017 | Andrianesis |
| 2017/0240075 A1 | 8/2017 | McCoy et al. |
| 2017/0252260 A1 | 9/2017 | Gummin et al. |
| 2017/0328384 A1 | 11/2017 | Goto et al. |
| 2017/0355288 A1 | 12/2017 | Barbat et al. |
| 2018/0001113 A1 | 1/2018 | Streeter |
| 2018/0012433 A1 | 1/2018 | Ricci |
| 2018/0036198 A1 | 2/2018 | Mergl et al. |
| 2018/0073491 A1 | 3/2018 | Gissen et al. |
| 2018/0084915 A1 | 3/2018 | Norman et al. |
| 2018/0115260 A1 | 4/2018 | Chiba et al. |
| 2018/0130347 A1 | 5/2018 | Ricci et al. |
| 2018/0132825 A1 | 5/2018 | Tachibana |
| 2018/0134191 A1 | 5/2018 | Ketels et al. |

(56) References Cited

U.S. PATENT DOCUMENTS

| | | |
|---|---|---|
| 2018/0141562 A1 | 5/2018 | Singhal |
| 2018/0149141 A1 | 5/2018 | Cullen et al. |
| 2018/0151035 A1 | 5/2018 | Maalouf et al. |
| 2018/0178808 A1 | 6/2018 | Zhao et al. |
| 2018/0249772 A1 | 9/2018 | Koo et al. |
| 2018/0251234 A1 | 9/2018 | Wang |
| 2018/0264975 A1 | 9/2018 | Bonk et al. |
| 2018/0281621 A1 | 10/2018 | Kaku et al. |
| 2018/0286189 A1 | 10/2018 | Motamedi et al. |
| 2018/0321703 A1 | 11/2018 | Gandhi et al. |
| 2018/0345841 A1 | 12/2018 | Prokhorov et al. |
| 2018/0348759 A1 | 12/2018 | Freeman et al. |
| 2018/0355991 A1 | 12/2018 | Pfahler |
| 2019/0005272 A1 | 1/2019 | Gault et al. |
| 2019/0023161 A1 | 1/2019 | Sullivan et al. |
| 2019/0039525 A1 | 2/2019 | Hu |
| 2019/0041986 A1 | 2/2019 | Rihn et al. |
| 2019/0042857 A1 | 2/2019 | Endo et al. |
| 2019/0059608 A1 | 2/2019 | Yan et al. |
| 2019/0061307 A1 | 2/2019 | Chen et al. |
| 2019/0083022 A1 | 3/2019 | Huang |
| 2019/0135150 A1 | 5/2019 | Gao et al. |
| 2019/0143869 A1 | 5/2019 | Sequi et al. |
| 2019/0154122 A1 | 5/2019 | Lima et al. |
| 2019/0197842 A1 | 6/2019 | Long et al. |
| 2019/0232842 A1 | 8/2019 | Boccuccia et al. |
| 2019/0291649 A1 | 9/2019 | Ito |
| 2020/0010001 A1 | 1/2020 | Pinkelman et al. |
| 2020/0015493 A1 | 1/2020 | Ergun et al. |
| 2020/0015593 A1 | 1/2020 | Norman et al. |
| 2020/0032822 A1 | 1/2020 | Keplinger et al. |
| 2020/0088175 A1 | 3/2020 | Li et al. |
| 2020/0112269 A1 | 4/2020 | Taghavi et al. |
| 2020/0179168 A1 | 6/2020 | Kelleher et al. |
| 2020/0197250 A1 | 6/2020 | Wyatt et al. |
| 2020/0223325 A1 | 7/2020 | Pinkelman et al. |
| 2020/0238854 A1 | 7/2020 | Gandhi et al. |
| 2020/0247274 A1* | 8/2020 | Gandhi ............... B60N 2/99 |
| 2020/0276971 A1 | 9/2020 | Takeda et al. |
| 2020/0282878 A1 | 9/2020 | Gandhi et al. |
| 2020/0298732 A1 | 9/2020 | Gandhi et al. |
| 2020/0307416 A1 | 10/2020 | Gandhi et al. |
| 2020/0309102 A1 | 10/2020 | Henderson et al. |
| 2020/0339242 A1 | 10/2020 | Tsuruta et al. |
| 2020/0377036 A1 | 12/2020 | Lee et al. |
| 2020/0378370 A1 | 12/2020 | Kopfer et al. |
| 2021/0095646 A1 | 4/2021 | Blecha et al. |
| 2021/0118597 A1 | 4/2021 | Pinkelman et al. |
| 2021/0132396 A1 | 5/2021 | Shin et al. |
| 2021/0153754 A1 | 5/2021 | Ozawa et al. |
| 2021/0162457 A1 | 6/2021 | Eberfors |
| 2021/0221269 A1 | 7/2021 | Baranowski et al. |
| 2021/0236061 A1 | 8/2021 | Severgnini et al. |
| 2021/0237809 A1 | 8/2021 | Rowe et al. |
| 2021/0265922 A1 | 8/2021 | Nakagawa |
| 2022/0001530 A1 | 1/2022 | Sameoto et al. |
| 2022/0012458 A1 | 1/2022 | Uetabira |
| 2022/0031178 A1 | 2/2022 | Brulet et al. |
| 2022/0106941 A1 | 4/2022 | Easton |
| 2022/0119202 A1 | 4/2022 | Morrissey et al. |
| 2022/0154703 A1 | 5/2022 | Shin et al. |
| 2022/0164079 A1 | 5/2022 | Severgnini et al. |
| 2022/0196109 A1 | 6/2022 | Gandhi et al. |
| 2022/0242328 A1 | 8/2022 | Pinkelman et al. |
| 2022/0258656 A1 | 8/2022 | Little |
| 2022/0299016 A1 | 9/2022 | Tsuruta et al. |
| 2022/0307485 A1 | 9/2022 | Gummin et al. |
| 2022/0314857 A1 | 10/2022 | Tsuruta et al. |
| 2022/0316458 A1 | 10/2022 | Tsuruta et al. |
| 2022/0412325 A1 | 12/2022 | Köpfer et al. |
| 2023/0078040 A1 | 3/2023 | Rowe et al. |
| 2023/0088911 A1 | 3/2023 | Song et al. |
| 2023/0119407 A1 | 4/2023 | Sugiyama et al. |
| 2023/0120436 A1 | 4/2023 | Tsuruta et al. |
| 2023/0124526 A1 | 4/2023 | Tsuruta et al. |
| 2023/0136197 A1 | 5/2023 | Gilmore et al. |
| 2023/0179122 A1 | 6/2023 | Palaniswamy et al. |
| 2023/0191953 A1 | 6/2023 | Panwar et al. |
| 2023/0193929 A1 | 6/2023 | Rowe et al. |
| 2023/0287871 A1 | 9/2023 | Rowe |
| 2023/0312109 A1 | 10/2023 | Joshi et al. |
| 2023/0331371 A1 | 10/2023 | Gupta et al. |
| 2023/0331372 A1 | 10/2023 | Gupta et al. |
| 2023/0337827 A1 | 10/2023 | Pinkelman et al. |
| 2024/0060480 A1 | 2/2024 | Panwar et al. |

FOREIGN PATENT DOCUMENTS

| | | |
|---|---|---|
| CN | 101417152 A | 4/2009 |
| CN | 102333504 A | 1/2012 |
| CN | 102152309 B | 11/2012 |
| CN | 103038094 A | 4/2013 |
| CN | 103147511 A | 6/2013 |
| CN | 102026842 B | 7/2013 |
| CN | 103935495 A | 7/2014 |
| CN | 102765354 B | 11/2014 |
| CN | 104290617 A | 1/2015 |
| CN | 204774820 U | 11/2015 |
| CN | 105517664 A | 4/2016 |
| CN | 106168523 A | 11/2016 |
| CN | 107111473 A | 1/2017 |
| CN | 206029888 U | 3/2017 |
| CN | 105946515 B | 4/2018 |
| CN | 108100228 A | 6/2018 |
| CN | 108819806 A | 11/2018 |
| CN | 106014897 B | 12/2018 |
| CN | 106956254 B | 3/2019 |
| CN | 109572966 A | 4/2019 |
| CN | 209010975 U | 6/2019 |
| CN | 105003405 B | 7/2019 |
| CN | 107485536 B | 1/2020 |
| CN | 112411375 A | 2/2021 |
| CN | 115706489 A | 2/2023 |
| DE | 10155119 A1 | 5/2003 |
| DE | 20309196 U1 | 11/2003 |
| DE | 10222022 A1 | 12/2003 |
| DE | 102010021902 A1 | 12/2011 |
| DE | 102016210214 A1 | 12/2017 |
| DE | 102019204866 A1 | 10/2020 |
| DE | 102008021679 B4 | 1/2021 |
| EP | 1420094 A1 | 5/2004 |
| EP | 1519055 A2 | 3/2005 |
| EP | 1904337 B1 | 10/2010 |
| EP | 2723069 A1 | 4/2014 |
| EP | 3196484 A1 | 7/2017 |
| FR | 3058108 A1 | 5/2018 |
| JP | S5870892 U | 5/1983 |
| JP | S61277898 A | 12/1986 |
| JP | H03276698 A | 12/1991 |
| JP | H06033895 A | 6/1994 |
| JP | 09-133069 A | 5/1997 |
| JP | H09168285 A | 6/1997 |
| JP | H10337061 A | 12/1998 |
| JP | 2003276698 A | 10/2003 |
| JP | 3706899 B2 | 10/2005 |
| JP | 2006000347 A | 1/2006 |
| JP | 2006006581 A | 1/2006 |
| JP | 2006248456 A | 9/2006 |
| JP | 2008014470 A | 1/2008 |
| JP | 2008138558 A | 6/2008 |
| JP | 2008154447 A | 7/2008 |
| JP | 4273902 B2 | 6/2009 |
| JP | 2009162233 A | 7/2009 |
| JP | 2010117457 A | 5/2010 |
| JP | 4576281 B2 | 11/2010 |
| JP | 5760241 | 8/2015 |
| JP | 2017175155 A | 9/2017 |
| JP | 2018188035 A | 11/2018 |
| JP | 2019094789 A | 6/2019 |
| JP | 2019101988 A | 6/2019 |
| JP | 2020090181 A | 6/2020 |
| JP | 2021107221 A | 7/2021 |
| KR | 19980044089 U | 9/1998 |
| KR | 20050056526 A | 6/2005 |

(56) References Cited

FOREIGN PATENT DOCUMENTS

| | | |
|---|---|---|
| KR | 1020130005989 | 1/2013 |
| KR | 101395364 B1 | 5/2014 |
| KR | 101861620 B1 | 4/2018 |
| KR | 1020180074003 A | 7/2018 |
| KR | 101931791 B1 | 12/2018 |
| KR | 20210052091 A | 5/2021 |
| KR | 20210086518 A | 7/2021 |
| KR | 102298464 B1 | 9/2021 |
| WO | 02011648 A1 | 2/2002 |
| WO | 2005004321 A1 | 1/2005 |
| WO | 2009079668 A2 | 6/2009 |
| WO | 2009111362 A2 | 9/2009 |
| WO | 2011017071 A2 | 2/2011 |
| WO | 2011111769 A1 | 9/2011 |
| WO | 2014145018 A2 | 9/2014 |
| WO | 2014172320 A1 | 10/2014 |
| WO | 2015037600 A1 | 3/2015 |
| WO | 2016017057 A1 | 2/2016 |
| WO | 2016130719 A2 | 8/2016 |
| WO | 2017077541 A1 | 5/2017 |
| WO | 2019043599 A1 | 3/2019 |
| WO | 2019097437 A1 | 5/2019 |
| WO | 2019173227 A1 | 9/2019 |
| WO | 2020110091 A2 | 6/2020 |
| WO | 2020183360 A1 | 9/2020 |
| WO | 2021118185 A2 | 6/2021 |

OTHER PUBLICATIONS

Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/452,734, filed Aug. 21, 2023.
Rowe et al., U.S. Appl. No. 18/453,395, filed Aug. 22, 2023.
Jani et al., "A review of shape memory alloy research, applications, and opportunities", Elsevier, 2014, pp. 1078-1113 (36 pages).
Tiseo et al., "A Shape Memory Alloy Based Tuneable Dynamic Vibration Absorber for Vibration Tonal Control", Journal of Theoretical and Applied Mechanics, 2010, pp. 135-153 (19 pages).
Williams et al., "Dynamic modelling of a shape memory alloy adaptive tuned vibration absorber", Elsevier, Journal of Vibration and Sound, 2005, pp. 211-234 (24 pages).
Araki et al., "Integrated mechanical and material design of quasi-zero-stiffness vibration isolator with superelastic Cu—Al—Mn shape memory alloy bars", Journal of Sound and Vibration, 2015 (34 pages).
Casciati et al., "Performance of a base isolator with shape memory alloy bars", Earthquake Engineering and Engineering Vibration, Dec. 2007 (8 pages).
Correa et al., "Mechanical Design of Negative Stiffness Honeycomb Materials", Integrating Materials and Manufacturing Innovation, 4:10, pp. 1-11, 2015 (11 pages).
Ferguson-Pell, "Seat Cushion Selection", J. Rehab. Res. Dev., Special Supplement #2, 23(3), pp. 49-73, 1986 (25 pages).
Miga Motor Company, "Miga Adrenaline—A Space Age Wire," retrieved from the Internet: <https://migamotors.com/index.php?main_page=product_info&cPath=1&products_id=37>, [retrieved Mar. 26, 2021] (1 page).
Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).
Endragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production— Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Ou et al., "jamSheets: Thin Interfaces with Tuneable Stiffness Enabled by Layer Jamming," Proceedings of the 8th International Conference on Tangible, Embedded, and Embodied Interaction, Feb. 2014 (8 pages).
Ou et al., "aeroMorph—Heat-sealing Inflatable Shape-change Materials for Interaction Design," Proceedings of the 29th Annual Symposium on User Interface Software and Technology, Oct. 2016, pp. 121-132 (10 pages).
Barbarino et al., "A review on shape memory alloys with applications to morphing aircraft", Smart Materials and Structures, Apr. 2014 (19 pages).
"HapWRAP: Soft Growing Wearable Haptic Device", retrieved from the Internet: < https://smartdevicess.createdsites. com>, dated May 27, 2019 (18 pages).
Yilmaz et al., "Detecting Vital Signs with Wearable Wireless Sensors", Sensors, Dec. 2010 (26 pages).
Choi et al. "Highly conductive, stretchable, and biocompatible Ag-Au core-sheath nanowire composite for wearable and implantable bioelectronics", Nature Nanotechnology 13, No. 11, 2018 (36 pages).
Gao et al., "Wearable Microfluidic Diaphragm Pressure Sensor for Health and Tactile Touch Monitoring", Advanced Materials, Oct. 2017 (15 pages).
Kweon et al., "Wearable high-performance pressure sensors based on three-dimensional electrospun conductive nanofibers", NPG Asia Materials 2018 (12 pages).
Wang et al. "Monitoring of the central blood pressure waveform via a conformal ultrasonic device", Nat Biomed Eng, Sep. 2018 (22 pages).
Agharese et al. "hapWRAP: Soft Growing Wearable Haptic Device", 2018 IEEE International Conference on Robotics and Automation (ICRA), May 2018 (7 pages).
Gao et al., "Fully integrated wearable sensor arrays for multiplexed in situ perspiration analysis", Nature, Jan. 2016 (30 pages).
Jitosho et al. "Exploiting Bistability for High Force Density Reflexive Gripping", 2019 International Conference on Robotics and Automation (ICRA), May 2019 (7 pages).
Wikipedia, "Slap bracelet", retrieved from the Internet: < https://en.wikipedia.org/wiki/Slap_bracelet>, [retrieved Mar. 12, 2021] (2 pages).
Maffiodo et al. "Three-Fingered Gripper with Flexure Hinges Actuated by Shape Memory Alloy Wires", Int. J. of Automation Technology, vol. 11, No. 3, pp. 355-360, 2017 (6 pages).
Buckner et al. "Roboticizing fabric by integrating functional fibers", Proceedings of the National Academy of Sciences, Oct. 2020 (10 pages).
Blain, "Refrigerants not required: Flexible metal cooling prototype demonstrates extreme efficiency", retrieved from the Internet: < https://newatlas.com/shape-memory-alloy-nitinol-heating-cooling/58837/> [retrieved Apr. 1, 2024], dated Mar. 13, 2019 (13 pages).
Taniguchi, "Flexible Artificial Muscle Actuator Using Coiled Shape Memory Alloy Wires", APCBEE Procedia 7, pp. 54-59, May 2013 (6 pages).
Acome et al., "Hydraulically amplified self-healing electrostatic actuators with muscle-like performance", Science 359, pp. 61-65, 2018 (5 pages).
Wang et al., "Recent Progress in Artificial Muscles for Interactive Soft Robotics", Advanced Materials, vol. 33, Issue 19, published Oct. 27, 2020 (48 pages).
Liang et al., "Comparative study of robotic artificial actuators and biological muscle", Advances in Mechanical Engineering, 2020 (25 pages).

(56) References Cited

OTHER PUBLICATIONS

El-Atab et al., "Soft Actuators for Soft Robotic Applications: A Review", Advanced Intelligent Systems 2020 (37 pages).
Pagoli et al., "Review of soft fluidic actuators: classification and materials modeling analysis", Smart Materials and Structures, vol. 31, 2021 (31 pages).
Park et al., "A Novel Fabric Muscle Based on Shape Memory Alloy Springs", Soft Robotics, vol. 7, No. 3, 2020 (11 pages).
EBAY, "Cardboard Dividers 5 Sets 7.5" X 10.5" X 4" High 12 cell", retrieved from the Internet: < https://www.ebay.com itm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).
Cazottes et al., "Bistable Buckled Beam: Modeling of Actuating Force and Experimental Validations", Journal of Mechanical Design, 2009 (10 pages).
Cazottes et al., "Design of Actuation for Bistable Structures Using Smart Materials," Advances in Science and Technology, vol. 54, pp. 287-292, 2008 (1st Page/Abstract only).
Cazottes et al., "Actuation of bistable buckled beams with Macro-Fiber Composites," IEEE/RSJ International Conference on Intelligent Robots and Systems, pp. 564-569, 2008 (7 pages).
Haines et al., "New Twist on Artificial Muscles," Proceedings of the National Academy of Sciences, vol. 113, No. 42, p. 11709-11716, Oct. 18, 2016 (9 pages).
Inoue et al., "High-performance structure of a coil-shaped soft-actuator consisting of polymer threads and carbon nanotube yarns," AIP Advances 8, 2018, (8 pages).
Abbas et al., "A Physics Based Model for Twisted and Coiled Actuator" 2017 IEEE International Conference on Robotics and Automation (ICRA), pp. 6121-6126, 2017 (6 pages).
Haines et al., "Artificial Muscles from Fishing Line and Sewing Thread" (Supplementary Materials) Science 343, 868, 2014 (36 pages).
Yip et al., "On the Control and Properties of Supercoiled Polymer Artificial Muscles," IEEE Transactions on Robotics 2017 (11 pages).
Alibaba.com, "Hangzhou Phase Change Technology Co., Ltd", Retrieved from the Internet: < https:// hzfeijie.en.alibaba.com/product/1448845650-220286736/phase_change_material_PCM_balls.html#!>, [Retrieved May 2, 2017] (3 pages).
Goodfellow Corporation, "New to Our Range: A Magnetic Shape Memory Alloy that Converts Magnetic Field Energy into Kinetic Energy," <retrieved from the Internet: http://www.goodfellowusa.com/corporate/news/US/Jun. 2011/US. htm> [retrieved Jan. 23, 2012] (2 pages).
Goodfellow Corporation, "Magnetic Shape Memory Material", <retrieved from the Internet: http://www.goodfellowusa.com/larger-quantities/alloys/magnetic-shape-memory-material/> [retrieved Jan. 23, 2012] (3 pages).
Sherrit et al., "Planar Rotary Motor using Ultrasonic Horns", Proc. SPIE 7981, Sensors and Smart Structures Technologies for Civil, Mechanical, and Aerospace Systems 2011, 798100, Apr. 13, 2011 (8 pages).
Henry, "Dynamic Actuation Properties of Ni-Mn-Ga Ferromagnetic Shape Memory Alloys", submitted to the Massachusetts Institute of Technology Department of Materials Science and Engineering on May 22, 2002, images on pp. 64-66 (202 pages).
Zhu et al., U.S. Appl. No. 18/433,896, filed Feb. 6, 2024.
Rowe et al., U.S. Appl. No. 18/468,029, filed Sep. 15, 2023.
Zhu et al., U.S. Appl. No. 18/399,075, filed Dec. 28, 2023.
Rowe et al., U.S. Appl. No. 18/178,302, filed Mar. 3, 2023.
Rowe et al., U.S. Appl. No. 18/399,026, filed Dec. 28, 2023.
Pinkelman et al., U.S. Appl. No. 17/729,522, filed Apr. 26, 2022.
International Search Report and Written Opinion for International Application No. PCT/US2024/014595 mailed on Jul. 15, 2024 (16 pages).
Williams et al., U.S. Appl. No. 18/738,516, filed Jun. 10, 2024.
Song et al., "Resistance Modelling of SMA Wire Actuators", Canadian Institute for NDE, International Workshop: Smart Materials, Structures & NDT in Aerospace Conference, Nov. 2011 (10 pages).
Rowe et al., U.S. Appl. No. 18/452,602, filed Aug. 21, 2023.
Motzki, "Efficient SMA Actuation-Design and Control Concepts", Proceedings, vol. 64, No. 1, MDPI, 2020 (9 pages).
Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).
Spiess, "#321 7 Sensors tested: Measuring Current with Microcontrollers (Arduino, ESP32, ESP8266)", uploaded on Apr. 5, 2020 by user "Andreas Spiess" accessible via the Internet: < https://www.youtube.com/watch? v=cG8moaufmQs>.

* cited by examiner

SHAPE MEMORY MATERIAL MEMBER-BASED ACTUATOR

CROSS-REFERENCE TO RELATED APPLICATIONS

This application claims the benefit of U.S. Provisional Application No. 63/485,398, filed on Feb. 16, 2023, which is incorporated herein by reference in its entirety.

FIELD

The subject matter described herein relates in general to actuators and, more particularly, to actuators that use shape memory material members.

BACKGROUND

Shape memory alloys change shape when an activation input is provided to the material. When the activation input is discontinued, the material returns to its original shape. Shape memory alloys are used in some actuator designs.

SUMMARY

In one respect, the present disclosure is directed to an actuator. The actuator can include a first outer body member and a second outer body member. The first outer body member can include a first portion and a second portion pivotably connected to each other. The actuator can include one or more shape memory material members. When an activation input is provided to the one or more shape memory material members, the one or more shape memory material members can contract, thereby causing the actuator to move in a direction that is different from a direction of contraction.

In one respect, the present disclosure is directed to an actuator. The actuator can include a first body member. The first outer body member can include a first portion and a second portion operatively connected to each other such that the first portion and the second portion can move relative to each other. The actuator can include a second body member. The actuator can include one or more shape memory material members. When an activation input is provided to the one or more shape memory material members, the one or more shape memory material members can contract. As a result, the actuator can be caused to morph into an activated configuration in which a height of the actuator increases.

In another respect, the present disclosure is directed to a system. The system can include an actuator. The actuator can include a first body member that includes a first portion and a second portion pivotably connected to each other. The actuator can include a second body member. The actuator can include one or more shape memory material members. The system can include one or more processors operatively connected to selectively activate the one or more shape memory material members. When an activation input is provided to the one or more shape memory material members, the one or more shape memory material members can contract. As a result, the actuator can be caused to morph into an activated configuration in which a height of the actuator increases.

In still another respect, the present disclosure is directed to an actuator. The actuator can include a first outer body member including a first portion and a second portion pivotably connected to each other by one or more hinges. The actuator can include one or more first biasing members operatively positioned to bias the first outer body member into a non-activated configuration of the actuator. The actuator can include a push plate operatively connected to the first outer body member. The actuator can include a second outer body member including a first portion, a second portion, and a base. The first portion and the second portion can be pivotably connected to the base. The actuator can include one or more second biasing members operatively positioned to bias the first portion and the second portion of the second outer body member into the non-activated configuration. The actuator can include one or more shape memory alloy wires. The actuator can include a first endcap and a second endcap positioned opposite the first endcap. The one or more shape memory alloy wires can be operatively connected to the first endcap and the second endcap. When an activation input is provided to the one or more shape memory alloy wires, the one or more shape memory alloy wires can contract. As a result, the actuator can be caused to morph into an activated configuration in which a height of the actuator increases.

DETAILED DESCRIPTION

Figure 1:
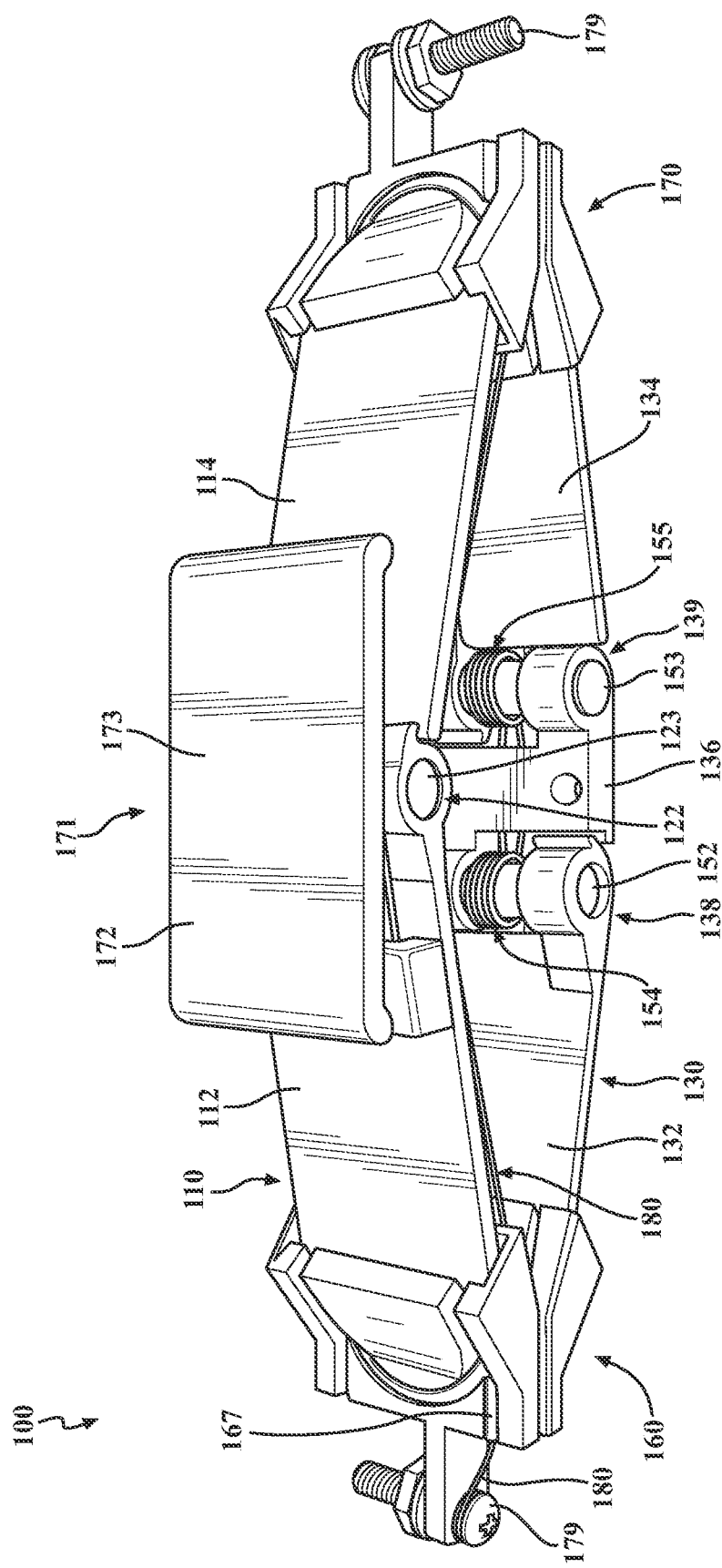
FIG. 1 is a view of an example of an actuator.

Accordingly, arrangements described herein are directed to, among other things, an actuator. The actuator can include one or more shape memory material members. The actuator can include a first outer body member and a second outer body member. The first outer body member can include a first portion and a second portion operatively connected to each other such that the first portion and the second portion can move relative to each other. In one or more arrangements, the first portion and the second portions can be pivotably connected to each other, such as by a hinge.

When an activation input (e.g., current) is provided to the one or more shape memory material members, the one or more shape memory material members can contract, thereby causing a the actuator to move in a direction that is out of plane with or otherwise different from a direction of contraction. In one or more arrangements, the actuator can move in a direction that is substantially 90 degrees relative to the direction of contraction. In one or more arrangements, when an activation input (e.g., current) is provided to the one or more shape memory material members, the one or more shape memory material members can contract, thereby causing the actuator to morph into an activated configuration in which a height of the actuator increases.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-14, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Arrangements described herein are directed to an actuator. Generally, the actuator can include one or more shape memory material members. The actuator can have any suitable form. One example of an actuator will be described herein. However, it will be understood this example is not intended to be limiting. Indeed, there are numerous actuator designs that include one or more shape memory material members that can be operated according to arrangements described herein.

Figure 2:
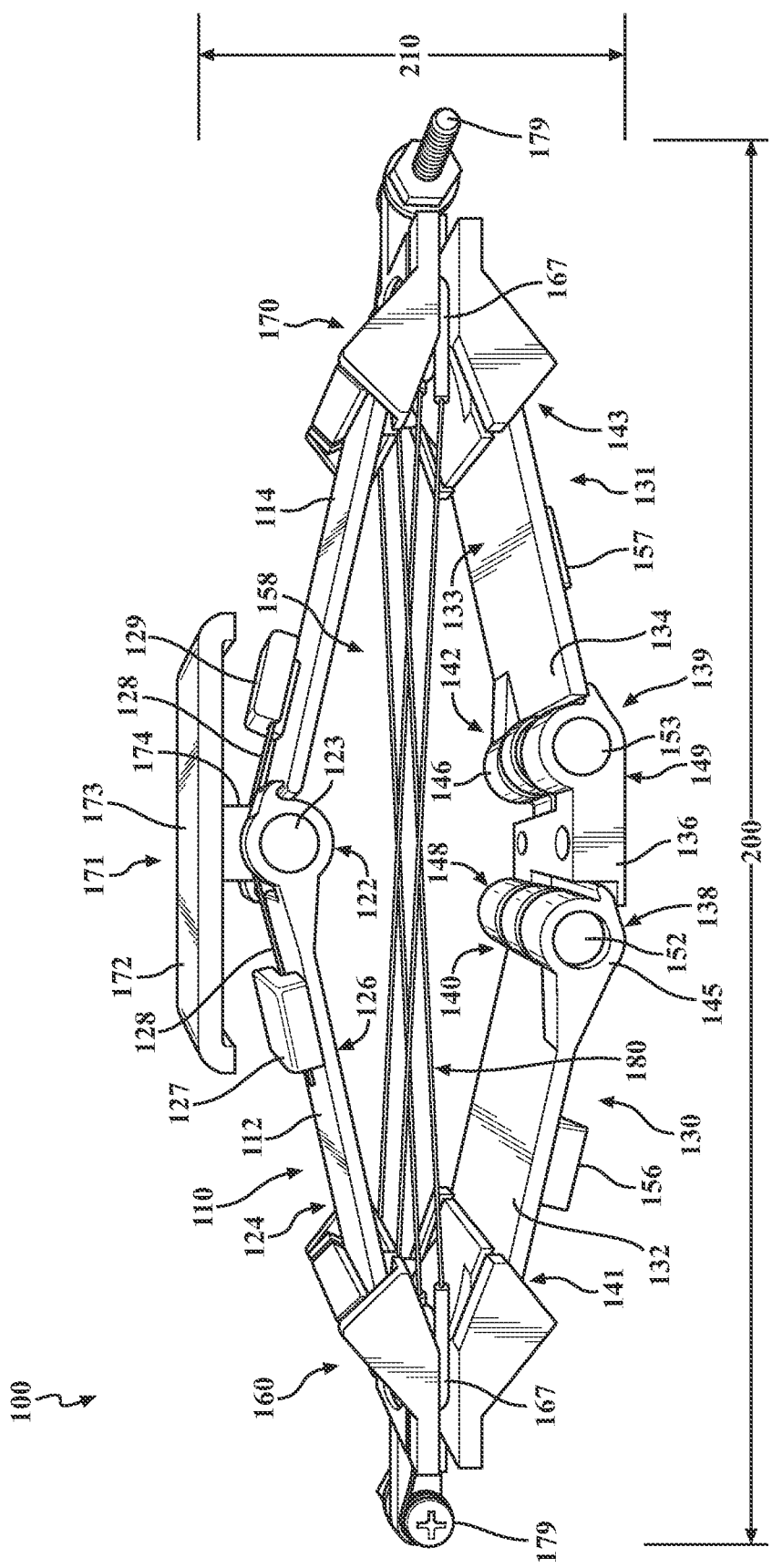
FIG. 2 is a view of the actuator of FIG. 1, showing a non-activated condition.
Figure 3:
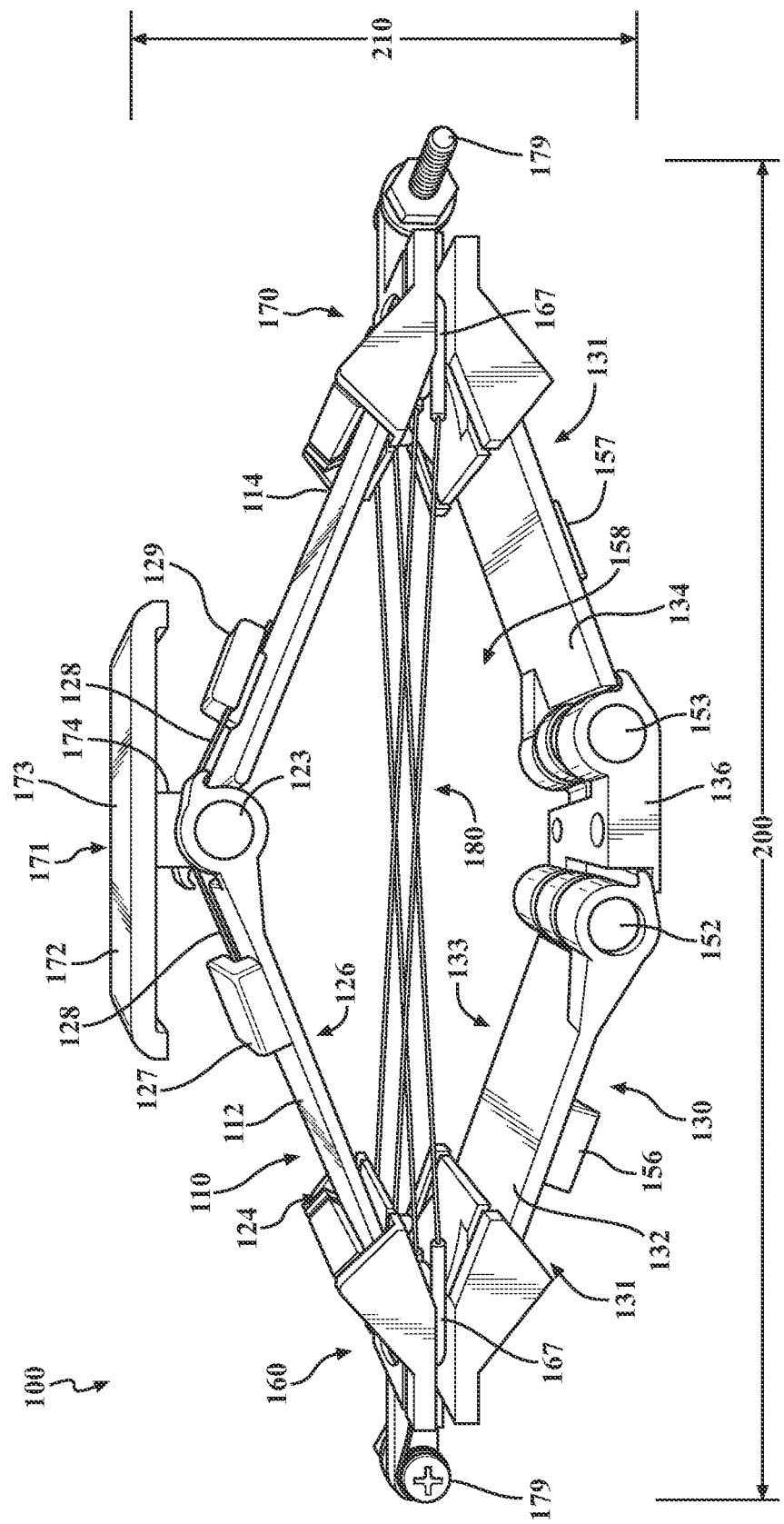
FIG. 3 is a view of the actuator of FIG. 1, showing an activated condition.

Referring to FIGS. 1-3, an example of an actuator 100 is shown. The actuator 100 can have any suitable configuration. The actuator 100 can include a first outer body member 110, a second outer body member 130, a first endcap 160, a second endcap 170, and a shape memory material member 180. These and other components will be described in turn below.

Figure 6:
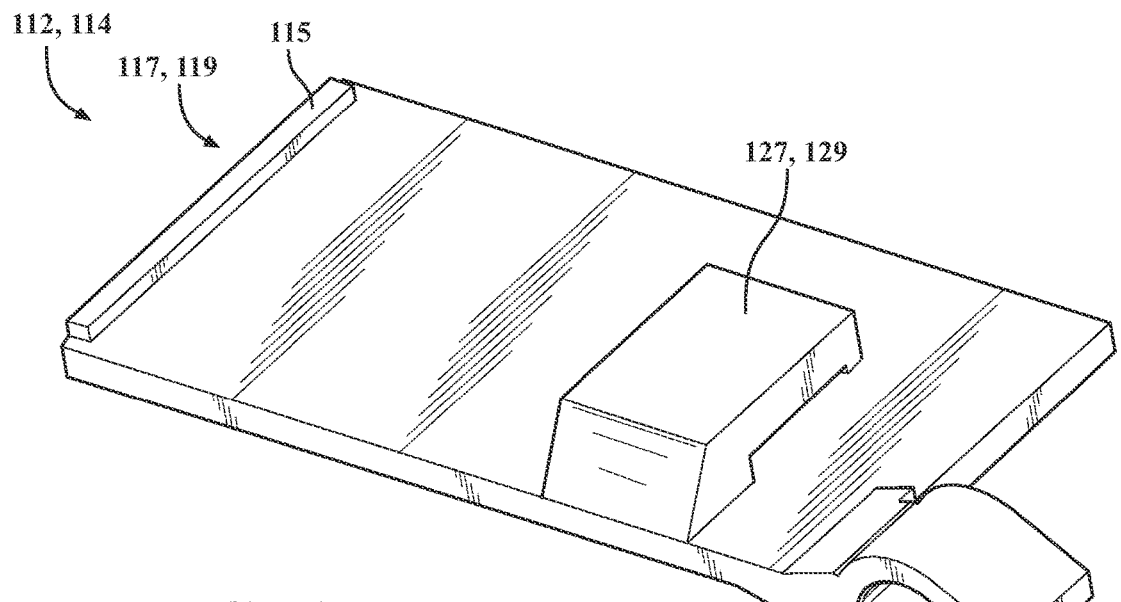
FIG. 6 is an example of a first portion or a second portion of a first outer body member of the actuator of FIG. 1.

The first outer body member 110 can include a first portion 112 and a second portion 114. The first portion 112 and the second portion 114 can have any suitable size, shape, and/or configuration. In some arrangements, the first portion 112 and the second portion 114 can be substantially identical to each other, but they can be in different orientations. In other arrangements, the first portion 112 and the second portion 114 can be different from each other in one or more respects. One example of the first portion 112 and the second portion 114 is shown in FIG. 6. The first portion 112 and the second portion 114 can be made of any suitable material, such as plastic or metal.

The first portion 112 and the second portion 114 can be operatively connected to each other such that the first portion 112 and the second portion 114 can move relative to each other. In one or more arrangements, the first portion 112 and the second portion 114 can be pivotably connected to each other. For example, the first portion 112 and the second portion 114 can be pivotably connected to each other by one or more hinges. In one or more arrangements, the first portion 112 and the second portion 114 can be pivotably connected to each other by one or more barrel hinges 122. In one or more arrangements, the one or more hinges can be a separate structure operatively connected to the first portion 112 and the second portion 114. Alternatively, the one or more hinges can be at least partially defined by the first portion 112 and the second portion 114.

The first portion 112 can include a first interfacing end 116 and a second interfacing end 117. The second portion 114 can include a first interfacing end 118 and a second interfacing end 119. The first interfacing end 116 of the first portion 112 and the first interfacing end 118 of the second portion 114 can be configured to interface with each other. For instance, the first interfacing end 116 of the first portion 112 can include a knuckle 120, and the first interfacing end 118 of the second portion 114 can include a knuckle 121. The knuckles 120, 121 can include openings that can be substantially aligned with each other to form in part the hinge. A pin 123 can pass through the aligned openings. In such arrangements, the first portion 112 and the second portion 114 can define the leaves of the hinge.

The second interfacing end 117 of the first portion 112 can be configured to interface with the first endcap 160. For instance, the second interfacing end 117 of the first portion 112 can include a lip 115, protrusion, or other feature for mechanically engaging a portion of the first endcap 160. The first endcap 160 can be configured to retainably engage the second interfacing end 117 of the first portion 112 while allowing the first portion 112 to pivot therein. The second interfacing end 119 of the second portion 114 can be configured to interface with the second endcap 170. For instance, the second interfacing end 119 of the second portion 114 can include a lip 115, protrusion, or other feature for mechanical engagement with a portion of the second endcap 170. The second endcap 170 can be configured to retainably engage the second interfacing end 119 of the second portion 114 while allowing the second portion 114 to pivot therein.

The first portion 112 and the second portion 114 can be angled relative to each other. As a result, the first outer body member 110 can have a generally V-shape. The first outer body member 110 can have an outer side 124 and an inner side 126.

The actuator 100 can include a biasing member 128. The biasing member 128 can be associated with the first outer body member 110. The biasing member 128 can be operatively positioned to bias the first outer body member 110 into a non-activated configuration of the actuator 100. More particularly, the biasing member 128 can exert a force on the first portion 112 and the second portion 114 to bias them into the non-activated configuration.

The biasing member 128 can be any suitable element for imparting a biasing force of the first outer body member 110. In one or more arrangements, the biasing member 128 can be a spring. More particularly, the biasing member 128 can be a torsion spring.

In some arrangements, the first outer body member 110 can be configured to engage or retain a portion of the biasing member 128. For instance, the first portion 112 can include a retaining member 127, and the second portion 114 can include a retaining member 129. The retaining members 127, 129 can have any suitable size, shape, and/or configuration. In one or more arrangements, the retaining members 127, 129 can be substantially L-shaped, as shown in FIGS. 2, 3, and 6, substantially U-shaped, substantially V-shaped, or substantially J-shaped, just to name a few possibilities. The retaining members 127, 129 can be formed as a unitary structure with the respective one of the first portion 112 and the second portion 114. In some arrangements, the retaining members 127, 129 can be formed separately from the first portion 112 and the second portion 114 and subsequently connected thereto.

Figure 8:
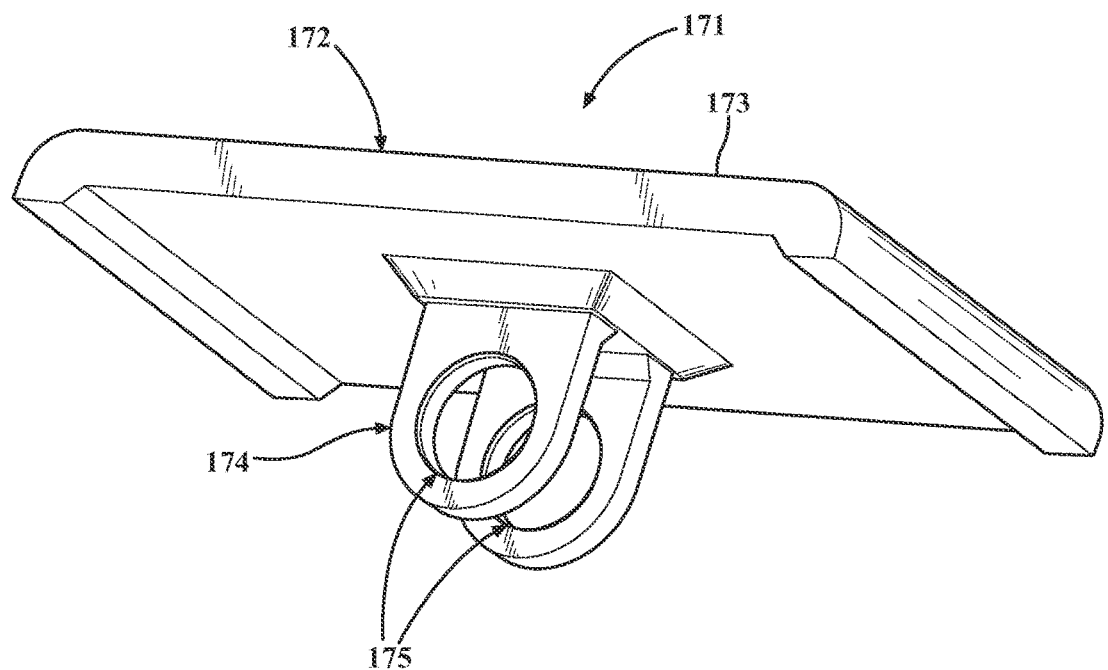
FIG. 8 is an example of a plush plate for the actuator of FIG. 1.

The actuator 100 can include a push plate 171. One example of the push plate 171 is shown in FIGS. 2-3 and 8. The push plate 171 can be configured to engage other structures or objects. The push plate 171 can focus the force of the actuator 100 on an intended target object. The push plate 171 can have any suitable size, shape, and/or configuration. In one or more arrangements, the push plate 171 can be substantially T-shaped. In some arrangements, the push plate 171 can include a platform 172 and a stem 174. In some arrangements, the platform 172 can be substantially rectangular in conformation, as is shown. In other arrangements, the platform 172 can be substantially circular, substantially square, substantially triangular, substantially polygonal, substantially hexagonal, substantially octagonal, or substantially trapezoidal, just to name a few possibilities.

The platform 172 can have an engaging surface 173. The engaging surface 173 can be configured to provide a desired actuation effect on an intended target. In some arrangements, the engaging surface 173 can be substantially planar. In some arrangements, the engaging surface 173 can include one or more contours, protrusions, steps, elements, or other raised or non-planar features. The engaging surface 173 can be configured to create a focal point for the actuation force of the actuator 100.

In some arrangements, the engaging surface 173 can be substantially parallel to the shape memory material member(s) 180 located within the cavity 158 and/or to a first dimension 200 of the actuator 100. In some arrangements, the engaging surface 173 can be angled relative to the shape memory material member(s) 180 located within the cavity 158 and/or to the first dimension 200 of the actuator 100. The engaging surface 173 can have any suitable orientation to achieve a desired actuation force effect.

The push plate 171 can be operatively connected to the first outer body member 110. For instance, a portion of the stem 174 can be configured to include one or more openings 175 that can substantially align with the openings 125 in the knuckles 120, 121 of the first portion 112 and the second portion 114 to form in part the hinge. The pin 123 can pass through the aligned openings 125, 175. While the first portion 112 and the second portion 114 can pivot relative to each other, the push plate 171 can substantially maintain its orientation. In some arrangements, the push plate 171 can be substantially centrally located on the first outer body member 110.

The second outer body member 130 can include a first portion 132, a second portion 134, and a base 136. The first portion 132, the second portion 134, and the base 136 can have any suitable size, shape, and/or configuration. In some arrangements, the first portion 132 and the second portion 134 can be substantially identical to each other, but they can be in different orientations. However, in other embodiments, the first portion 132 and the second portion 134 can be different from each other in one or more respects.

Figure 9:
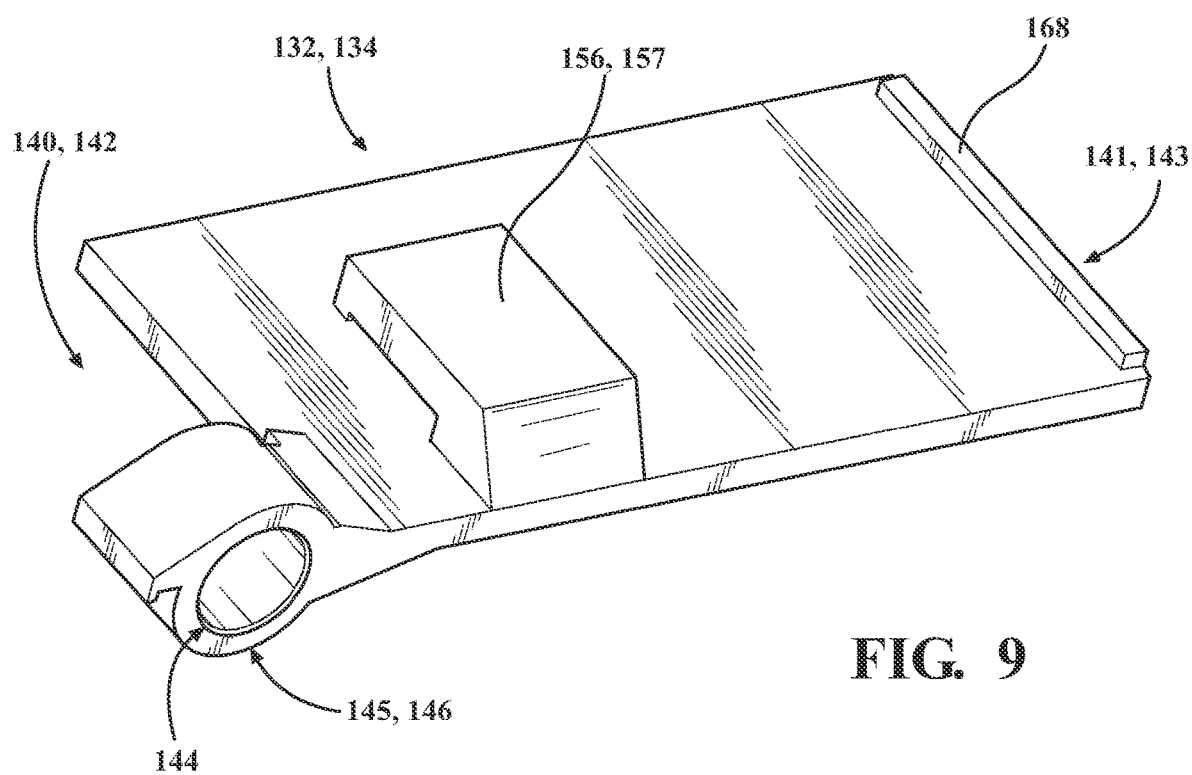
FIG. 9 is an example of a first portion or a second portion of a second outer body member of the actuator of FIG. 1.

One example of the first portion 132 and the second portion 134 is shown in FIG. 9. The first portion 132 and the second portion 134 can be made of any suitable material, such as plastic or metal. In some arrangements, the first portion 132 and the second portion 134 of the second outer body member 130 can be substantially mirror images of the first portion 112 and the second portion 114 of the first outer body member 110. The first portion 132 can include a first interfacing end 140 and a second interfacing end 141. The second portion 134 can include a first interfacing end 142 and a second interfacing end 143.

The first portion 132 and the second portion 134 can be operatively connected to another element such that the first portion 132 and the second portion 134 can move relative to each other. In one or more arrangements, the first portion 132 and the second portion 134 can be operatively connected to each other. In one or more arrangements, the first portion 132 and the second portion 134 can both be operatively connected to another structure. For instance, each of the first portion 132 and the second portion 134 can be pivotably connected another structure. In one or more arrangements, each of the first portion 132 and the second portion 134 can be pivotably connected to the base 136. For example, the first portion 132 can be pivotably connected to the base 136 by one or more hinges, and the second portion 134 can be pivotably connected to the base 136 by one or more hinges. In one or more arrangements, the first portion 132 can be pivotably connected to the base 136 by one or more barrel hinges 138, and the second portion 134 can be pivotably connected to the base 136 by one or more barrel hinges 139. The first portion 132 and the second portion 134 can be located on opposite sides of the base 136.

In some arrangements, the one or more hinges can be separate structures operatively connected to the first portion 132 and the base 136 and to the second portion 134 and the base 136. Alternatively, in some arrangements, the one or more hinges can be formed at least in part by the first portion 132, the second portion 134, and/or the base 136.

Figure 7:
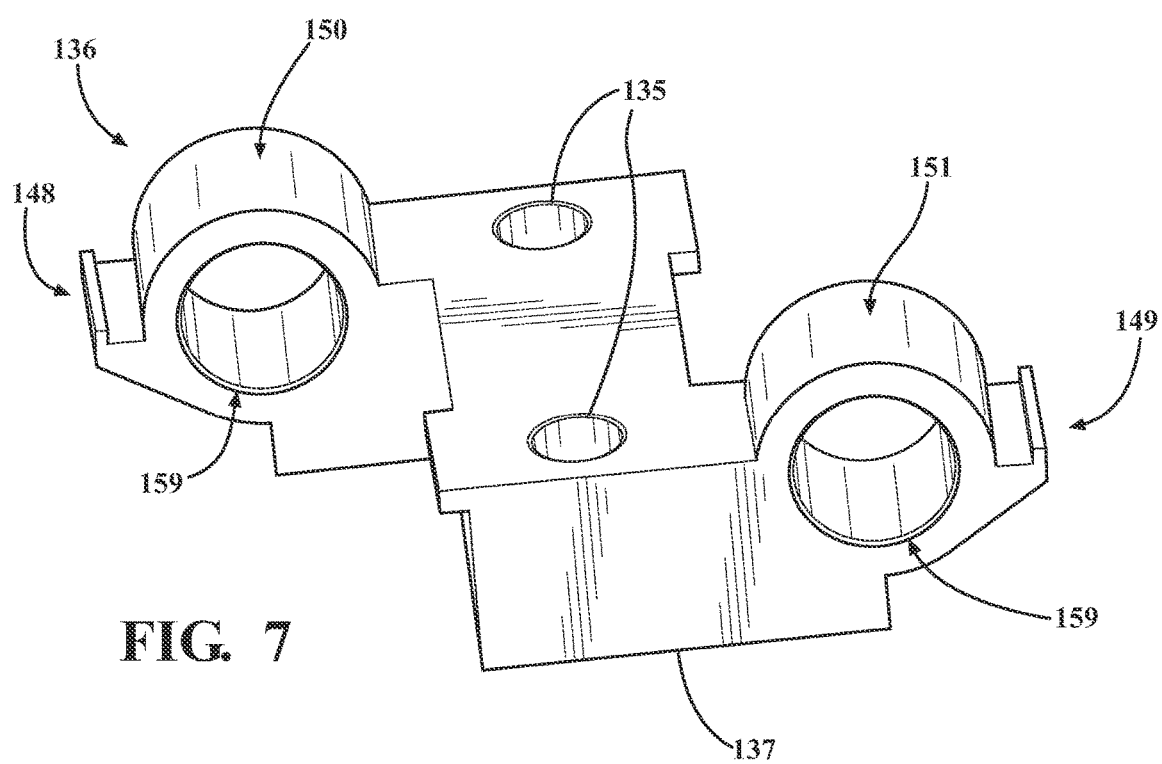
FIG. 7 is an example of a base of a second outer body member of the actuator of FIG. 1.

The base 136 can have any suitable size, shape, and/or configuration. One example of the base 136 is shown in FIG. 7. The base 136 can have a first interfacing end 148 and a second interfacing end 149. The base 136 can be configured to interface with the first portion 132 and the second portion 134. The first interfacing end 140 of the first portion 132 and the first interfacing end 142 of the second portion 134 can be configured to interface with the base 136. For instance, the first interfacing end 140 of the first portion 132 can include one or more knuckles 145, and the first interfacing end 142 of the second portion 134 can include one or more knuckles 146. The knuckles 145, 146 can define an opening 144. Further, the first interfacing end 148 of the base 136 can include one or more knuckles 150, and the second interfacing end 149 of the base 136 can include one or more knuckles 151. The knuckles 150, 151 can define an opening 159. The opening(s) 144 of the knuckle(s) 145 of the first portion 132 and the opening(s) 159 of the knuckle(s) 150 of the base 136 can be substantially aligned with each other. A pin 152 can be received in the aligned openings 144, 159. In such arrangements, the first portion 132 and the base 136 can be like the leaves of the hinge. The opening(s) 144 of the knuckle(s) 146 of the second portion 134 and the opening(s) 159 of the knuckle(s) 151 of the base 136 can be substantially aligned with each other. A pin 153 can be received in the aligned openings 144, 159. In such arrangements, the second portion 134 and the base 136 can be like the leaves of the hinge.

The second interfacing end 141 of the first portion 132 can be configured to interface with the first endcap 160. For instance, the second interfacing end 141 of the first portion 132 can include a lip 168, protrusion, or other feature for mechanically engaging a portion of the first endcap 160. The first endcap 160 can be configured to retainably engage the second interfacing end 141 of the first portion 132 while allowing the first portion 132 to pivot therein. The second interfacing end 143 of the second portion 134 can be configured to interface with the second endcap 170. For instance, the second interfacing end 143 of the second portion 134 can include a lip 168, protrusion, or other feature for mechanical engagement with a portion of the second endcap 170. The second endcap 170 can be configured to retainably engage the second interfacing end 143 of the second portion 134 while allowing the second portion 134 to pivot therein.

The first portion 132 and the second portion 134 can be angled relative to each other. The second outer body member 130 can have an outer side 131 and an inner side 133.

One or more biasing members can be associated with the second outer body member 130. For instance, a biasing member 154 can be associated with the first portion 132 and the base 136, and a biasing member 155 can be associated with the second portion 134 and the base 136. The biasing members 154, 155 can be operatively positioned to bias the second outer body member 130 into a non-activated configuration of the actuator 100. More particularly, the biasing member 154 can exert a force on the first portion 132 and the base 136 to bias at least the first portion 132 into the non-activated configuration. Further, the biasing member 155 can exert a force on the second portion 134 and the base 136 to bias at least the second portion 134 into the non-activated configuration.

The biasing members 154, 155 can be any suitable element for imparting a biasing force on the second outer body member 130. In one or more arrangements, the biasing members 154, 155 can be springs. More particularly, the biasing members 154, 155 can be torsion springs.

In some arrangements, the biasing members 128, 154, 155 can be substantially identical to each other. In some arrangements, one or more of the biasing members 128, 154, 155 can be different from the other biasing members in one or more respects, such as in terms of size, shape, configuration, and/or biasing force, just to name a few possibilities.

In some arrangements, the second outer body member 130 can be configured to engage or retain a portion of the biasing member 154, 155. For instance, the first portion 132 can include a retaining member 156, and the second portion 134 can include a retaining member 157. The retaining members 156, 157 can have any suitable size, shape, and/or configuration. In one or more arrangements, the retaining members 156, 157 can be substantially L-shaped, as shown in FIGS. 2, 3, and 9, substantially U-shaped, substantially V-shaped, or substantially J-shaped, just to name a few possibilities. The retaining members 156, 157 can be formed as a unitary structure with the respective one of the first portion 132 and the second portion 134. In some arrangements, the retaining members 156, 157 can be formed separately from the first portion 132 and the second portion 134 and subsequently connected thereto.

The first outer body member 110 and the second outer body member 130 can be oriented such that their inner sides 126, 133 face each other. The first outer body member 110 and the second outer body member 130 can define a cavity 158.

The base 136 can have any suitable size, shape, and/or configuration. In one or more arrangements, the base 136 can be substantially rectangular. The base 136 can be made of any suitable material, such as metal or plastic. The base 136 can be made of the same material as the first outer body member 110 and/or the second outer body member 130, or the base 136 can be made of a different material.

The base 136 can be configured to be supported on a surface. The base 136 can include an engaging surface 137. The engaging surface 137 can be configured to substantially matingly engage a surface on which the base 136 is supported. In some arrangements, the engaging surface 137 can be substantially planar. In some arrangements, the engaging surface 137 can include one or more non-planar features, such as contours, protrusions, recesses, curves, etc. In some arrangements, the base 136 can be configured for connection to another surface. For instance, the base 136 can include one or more apertures 135 to accommodate a fastener for attachment to another surface or structure.

The actuator 100 can include a first endcap 160 and a second endcap 170. The first endcap 160 and the second endcap 170 can be spaced apart. The first endcap 160 and the second endcap 170 can face toward each other. The first endcap 160 and the second endcap 170 can be substantially aligned with each other.

The first endcap 160 and the second endcap 170 can have any suitable size, shape, and/or configuration. In one or more arrangements, the first endcap 160 and the second endcap 170 can be substantially identical to each other. However, the first endcap 160 and the second endcap 170 can be oriented differently. The first endcap 160 and the second endcap 170 can be made of any suitable material, such as plastic or metal. In one or more arrangements, the first endcap 160 and the second endcap 170 can be different from each other in one or more respects.

One example of an endcap is shown in FIGS. 5A-5F. For convenience, the endcap will be referred to as the first endcap 160, but it will be understood that the description is also equally applicable to the second endcap 170.

Figure 5A:
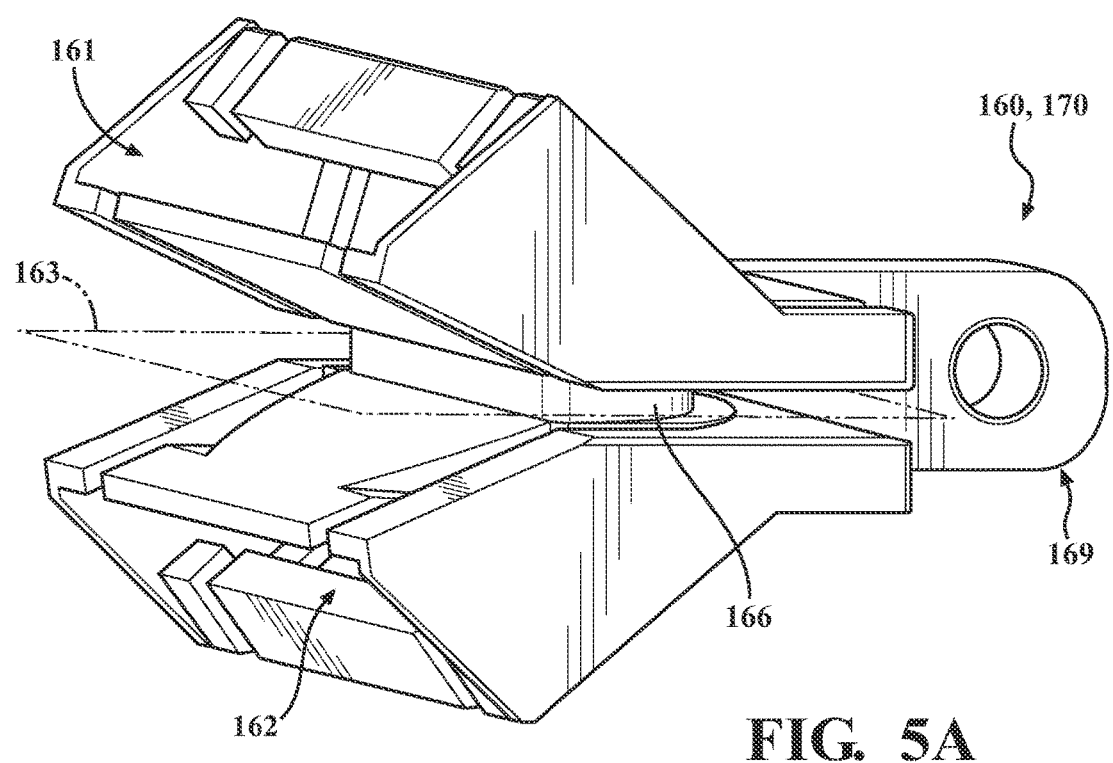
FIGS. 5A-5F show different views of an example of an endcap for the actuator of FIG. 1.
Figure 5B:
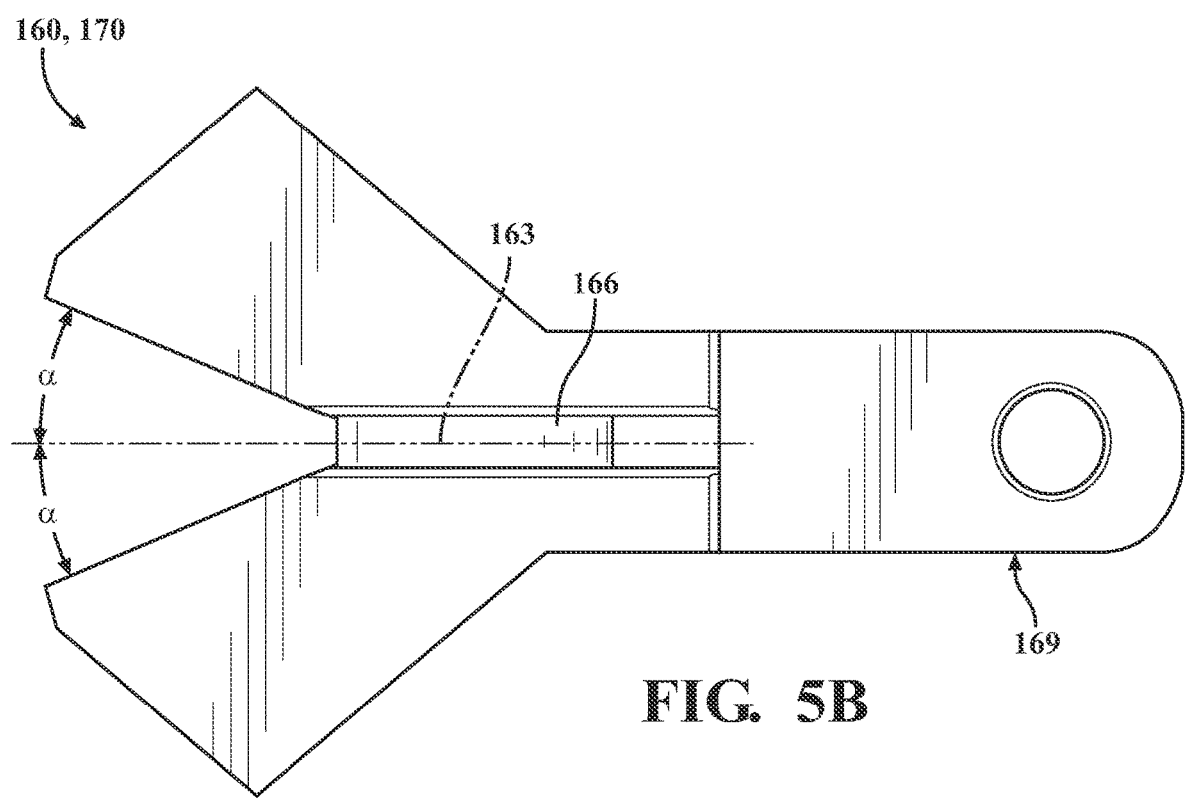
Figure 5C:
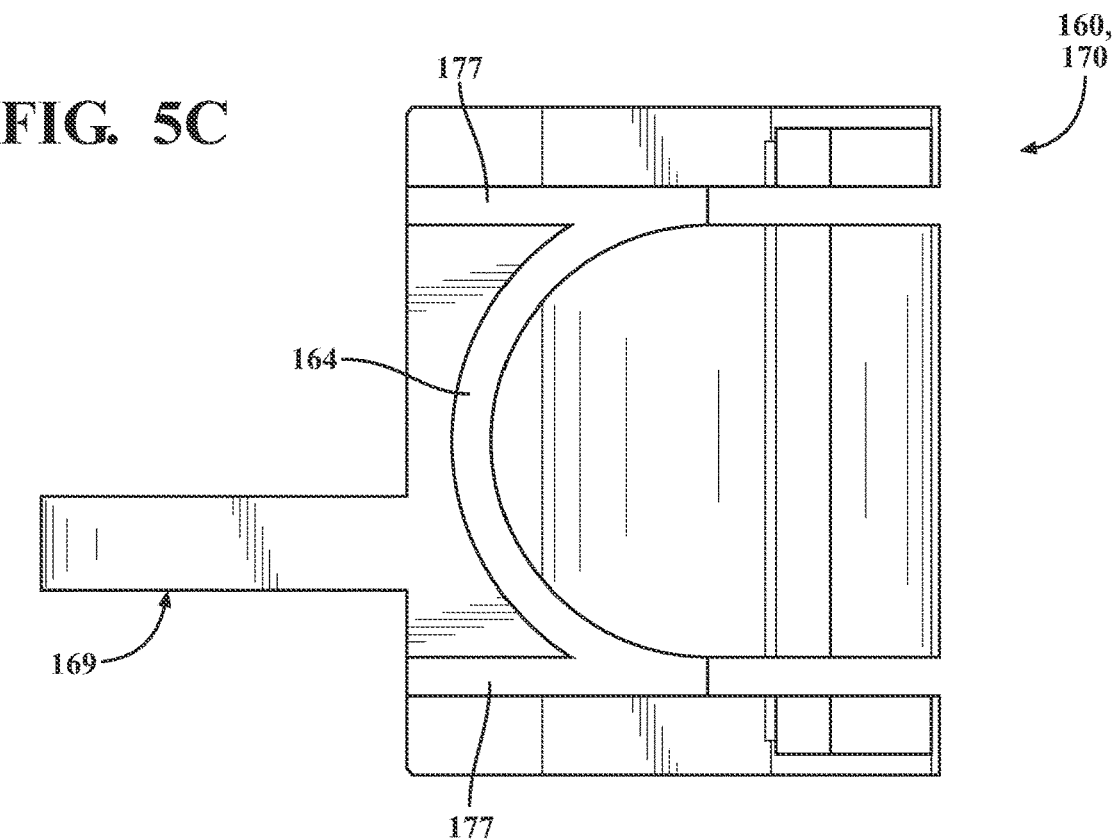
Figure 5D:
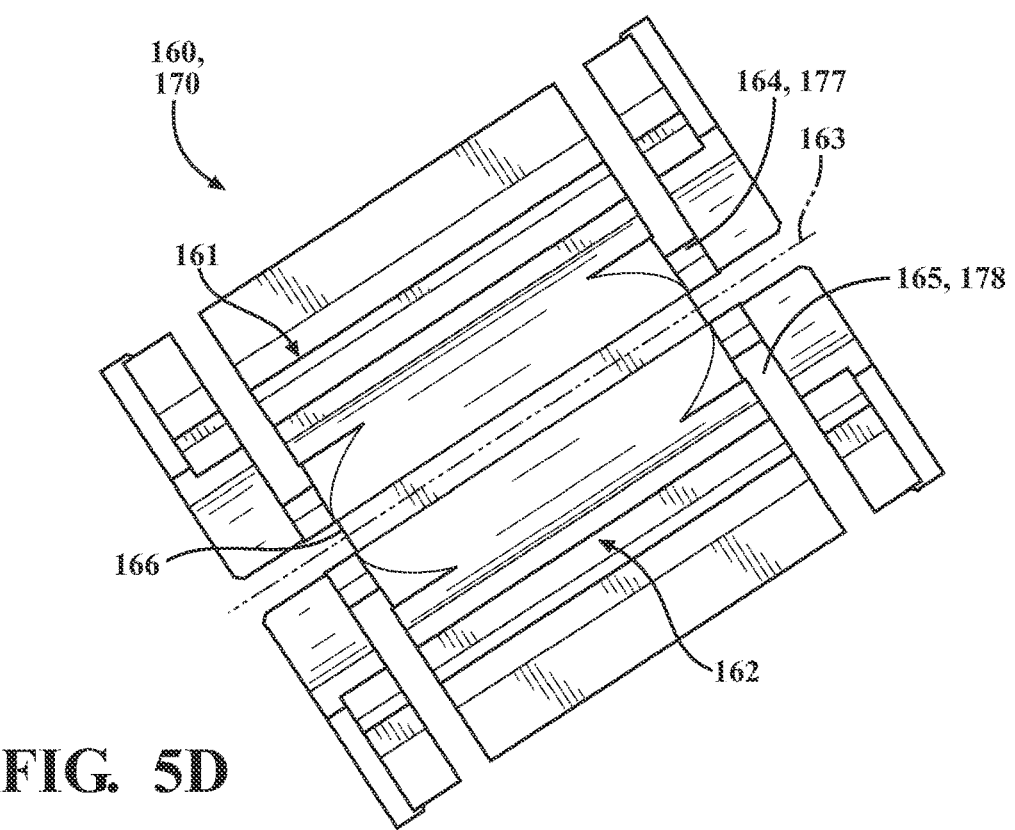
Figure 5E:
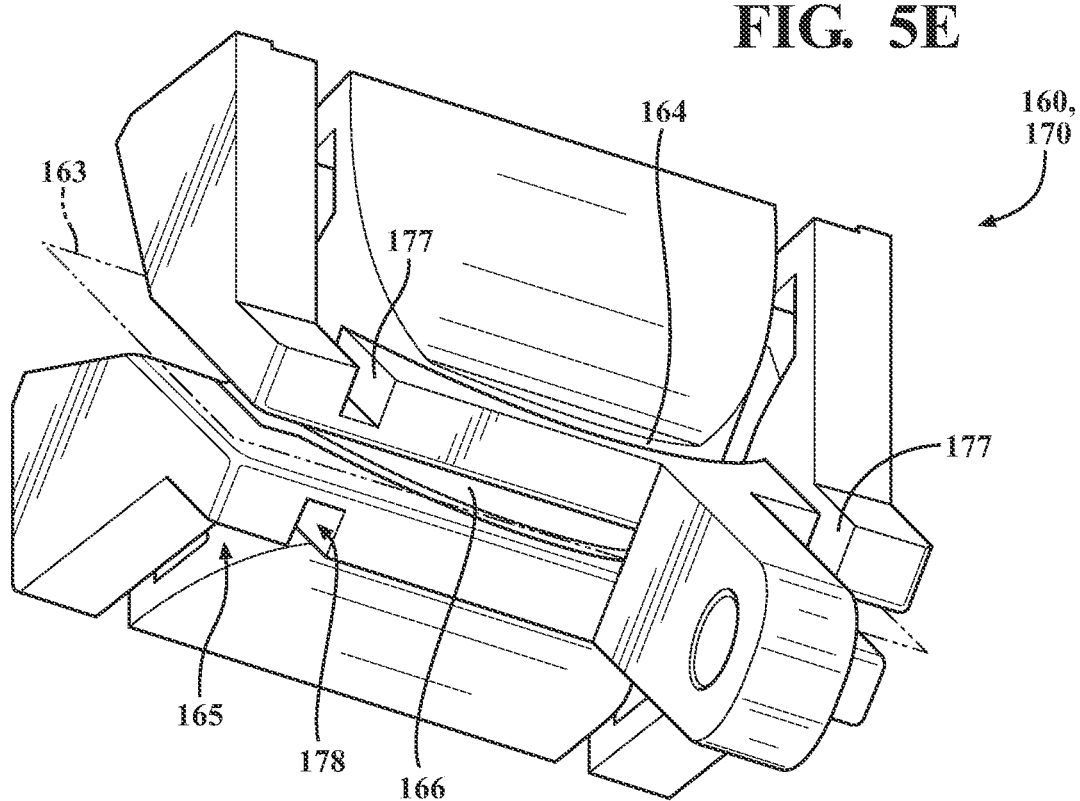
Figure 5F:
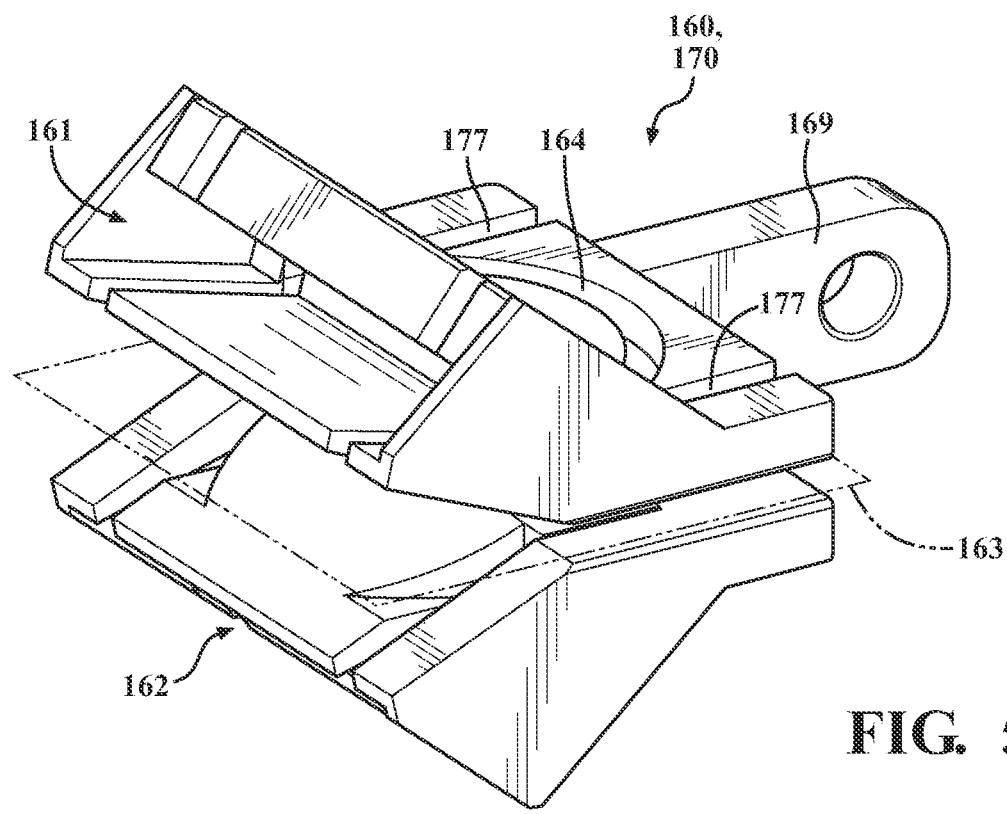

The first endcap 160 can be configured to engage the first outer body member 110 and the second outer body member 130. For instance, the first endcap 160 can include a first engaging cavity 161 and a second engaging cavity 162. The first engaging cavity 161 and the second engaging cavity 162 can be angled relative to a plane 163 of the first endcap 160, as shown in FIG. 5B. For instance, in one or more arrangements, the first engaging cavity 161 and the second engaging cavity 162 can be at an angle α of about 20 to about 25 degrees relative to the plane 163. The first endcap 160 can be substantially symmetrical about the plane 163.

The first engaging cavity 161 of the first endcap 160 can be configured for operative connection to the first outer body member 110. More particularly, the first engaging cavity 161 of the first endcap 160 can be configured for operative connection to the second interfacing end 117 of the first portion 112. Further, the first engaging cavity 161 of the second endcap 170 can be configured for operative connection to the second interfacing end 119 of the second portion 114.

There can be any suitable form of operative connection between the first outer body member 110 and the first engaging cavity 161. For instance, the first outer body member 110 can be operatively connected to the first engaging cavity 161 by mechanical engagement, one or more fasteners, one or more adhesives, and/or one or more brazes or weld, just to name a few possibilities. As an example, the first outer body member 110 can include a lip 115, protrusion, or other features that can engage with the respective endcap within the first engaging cavity 161, such as by interlocking engagement. The first outer body member 110 can be retainably engaged by the first engaging cavity 161. The first engaging cavity 161 can provide end containment for the first portion 112 or the second portion 114 to pivot in when the actuator 100 is activated or deactivated.

The second engaging cavity 162 of the first endcap 160 can be configured for operative connection to the second outer body member 130. More particularly, the second engaging cavity 162 of the first endcap 160 can be configured for operative connection to the second interfacing end 119 of the first portion 132. Further, the second engaging cavity 162 of the second endcap 170 can be configured for operative connection to the second interfacing end 119 of the second portion 134. The above discussion of the operative connection between the first outer body member 110 and the first engaging cavity 161 applies equally to the connection between the second outer body member 130 and the second engaging cavity 162. The first portion 132 and/or the second portion 134 of the second outer body member 130 can include a lip 115, protrusion, or other features can engage with the respective endcap within the second engaging cavity 162, such as by interlocking engagement. The second outer body member 130 can be retainably engaged by the second engaging cavity 162. The second engaging cavity 162 can provide end containment for the first portion 132 or the second portion 134 to pivot in when the actuator 100 is activated or deactivated.

The first endcap 160 can include a plurality of features to allow for engagement with the shape memory material member(s) 180. For instance, the first endcap 160 can include one or more features to enable the shape memory material member(s) 180 to turn around and extend toward the opposite endcap. For instance, each of the first endcap 160 and the second endcap 170 can include a first groove 164, a second groove 165, and a post 166. In some arrangements, the shape memory material member 180 can wrap around the post 166. In some arrangements, the shape memory material member 180 can extend along the first groove 164 and/or the second groove 165.

The first groove 164 and the second groove 165 can have any suitable size, shape, and/or configuration. In some arrangements, the first groove 164 and the second groove 165 can be substantially identical to each other. In other arrangements, the first groove 164 and the second groove 165 can be different from each other in one or more respects. In one or more arrangements, the first groove 164 and the second groove 165 can be substantially U-shaped. The post 166 can have any suitable size, shape, and/or configuration. For instance, the post 166 can be substantially semi-cylindrical.

The first endcap 160 can include one or more inlet/outlet passages 177 that extend between the first groove 164 and the exterior of the first endcap 160. The first endcap 160 can include one or more inlet/outlet passages 178 that extend between the second groove 165 and the exterior of the first endcap 160. The inlet/outlet passages 177, 178 can provide an entry or exit point for the shape memory material member(s) 180 from the first endcap 160 or the second endcap 170.

In some arrangements, at least a portion of the shape memory material member(s) 180 can be coated or covered with an insulating material. For instance, the portions of the shape memory material member(s) 180 that interact with the first groove 164, the second groove 165, and the post 166 can be coated or covered with an insulating material 167. In some arrangements, the insulating material 167 can be a sleeve or a wrap.

The shape memory material members(s) 180 can extend between the first endcap 160 and the second endcap 170 in any suitable manner. One non-limiting example of the routing of the shape memory material members(s) 180 will now be described. From the exterior of the first endcap 160, the shape memory material member 180 can enter the inlet/outlet passages 177 and extend substantially straight into a portion of the first groove 164. The shape memory material member 180 can extend substantially straight out of the first groove 164 and into the cavity 158. The shape memory material member 180 can extend across the cavity 158 and into the first groove 164 of the second endcap 170. The shape memory material member 180 can turn around in the first groove 164 of the second endcap 170. From there, the shape memory material member 180 can extend back across the cavity 158 and wrap around the post 166 of the first endcap 160. The shape memory material member 180 can then extend back across the cavity 158 and wrap around the post 166 of the second endcap 170. The shape memory material member 180 can extend across the cavity 158 and enter the second groove 165 of the first endcap 160. The shape memory material member 180 can extend within the second groove 165 and extend back across the cavity 158 and into the second groove 165 of the second endcap 170. The shape memory material member 180 can exit the second groove 165 via one of the inlet/outlet passages 178 of the second endcap 170.

It will be understood that other arrangements of the shape memory material member 180 are possible. For instance, the shape memory material member 180 can extend between post 166 of the first endcap 160 and the second endcap 170. As another example, the shape memory material member 180 can extend between the first groove 164 of the first endcap 160 and the first groove 164 of the second endcap 170. As still another example, the shape memory material member 180 can extend between the second groove 165 of the first endcap 160 and the second groove 165 of the second endcap 170. Still further, the shape memory material member 180 can extend between the first groove 164 of the first endcap 160 and the second groove 165 of the second endcap 170. As another possibility, the shape memory material member 180 can extend between the second groove 165 of the first endcap 160 and the first groove 164 of the second endcap 170. Of course, it will be appreciated that the shape memory material member(s) 180 can be routed in any combination of the above and other examples.

It should be noted that, when extending across the cavity 158, the shape memory material members(s) 180 can extend substantially straight across from one endcap to the other endcap. Alternatively, the shape memory material members(s) 180 can extend from one side of one of the endcaps to the opposite side of the other endcap. Thus, the shape memory material members(s) 180 can extend substantially diagonally across the cavity 158. In some arrangements, the shape memory material members(s) 180 can be wrapped around the post 166 a plurality of times. For instance, in one or more arrangements, the shape memory material members(s) 180 can be wrapped twice around the post 166.

The first endcap 160 can include a flange 169. The flange 169 can provide a connection point for an end of the shape memory material member(s) 180. In this location, the shape memory material member(s) 180 can operatively connected to another conductor or other element to a power source. In some instance, the shape memory material member(s) 180 can be operatively connected to the flange 169, such as by one or more fasteners 179 (FIG. 1), one or more adhesives, one or more forms of mechanical engagement, one or more other forms of connection, and/or any combination thereof.

The actuator 100 can include one or more shape memory material members 180. The shape memory material members 180 can be operatively connected to the first endcap 160 and the second endcap 170. Any suitable manner of operative connection can be provided, such as one or more fasteners, one or more adhesives, one or more welds, one or more brazes, one or more forms of mechanical engagement, or any combination thereof. In going from one endcap to the other endcap, the shape memory material member(s) 180 can extend across the cavity 158.

In some arrangements, there can be a single shape memory material member 180. In such case, the shape memory material member 180 can, for example, extend straight across the cavity from the first endcap 160 and the second endcap 170. In another example, the shape memory material member 180 can extend in a serpentine pattern between the first endcap 160 and the second endcap 170. In some arrangements, the first endcap 160 and the second endcap 170 can be configured to allow the shape memory material member 180 to turn around and extend in the opposite direction, as described above.

In some arrangements, there can be a plurality of shape memory material members 180. In such case, the plurality of shape memory material members 180 can be distributed, arranged, and/or oriented in any suitable manner. For instance, the shape memory material members 180 can extend substantially parallel to each other. In other arrangements, one or more of the shape memory material members 180 can extend non-parallel to the other shape memory material members 180. In some instances, some of the plurality of shape memory material members 180 may cross over each other. When activated, the shape memory material member(s) 180 can be configured to overcome the biasing forces exerted by the biasing members 128, 154, 155.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 180 can be shape memory material wires. As an example, the shape memory material members 180 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 150 MPA to about 400 MPa. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members 180 to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, California. As a further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature $T_{SMA}$. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material member(s) 180 are described, in some implementations, as being wires, it will be understood that the shape memory material member(s) 180 are not limited to being wires. Indeed, it is envisioned that suitable shape memory materials may be employed in a variety of other forms, such as sheets, plates, panels, strips, cables, tubes, or combinations thereof. In some arrangements, the shape memory material member(s) 180 may include an insulating coating or an insulating sleeve over at least a portion of their length.

It should be noted that the shape memory material member(s) 180 can be located substantially entirely within the overall envelope of the actuator 100. A substantial majority of the shape memory material member(s) 180 can be located within the cavity 158. "Substantial majority" means about 60% or greater, about 65% or greater, about 70% or greater, about 75% or greater, about 80% or greater, about 85% or greater, about 90% or greater, or about 95% or greater. A portion of the shape memory material member(s) 180 can be routed within the first endcap 160 and the second endcap 170. A portion of the shape memory material member(s) 180 can extend outside of a respective one of the endcaps 160, 170 for connection to the flange 169 and/or to another conductor and/or power source. Thus, the actuator 100 can be a self-contained unit.

The actuator 100 can include a first dimension 200 and the second dimension 210. The first dimension 200 can describe a width of the actuator 100, and the second dimension 210 can describe a height of the actuator 100. The first dimension 200 and the second dimension 210 can be substantially perpendicular to each other.

FIG. 2 shows an example of the actuator 100 in a non-activated configuration. Here, the shape memory material member(s) 180 are not activated. FIG. 3 shows an example of the actuator 100 in an activated configuration. When an activation input (e.g., electrical energy) is provided to the shape memory material member(s) 180, the shape memory material member(s) 180 can contract. This contraction causes the shape memory material member(s) 180 to pull the first endcap 160 and the second endcap 170 toward each other in a direction that corresponds to the first dimension 200. As a result, the first outer body member 110 and the second outer body member 130 can extend outward and away from each other in a direction that corresponds to the second dimension 210. It will be appreciated that, in going from the non-activated condition to the activated condition, the first dimension 200 (i.e., the width) of the actuator 100 can decrease and/or the second dimension 210 (i.e., the height) of the actuator 100 can increase. Further, it will be appreciated that the actuator 100 can deliver a force in a direction that is out of plane or otherwise different from the direction of contraction of the shape memory material member(s) 180.

When the actuator 100 goes from a non-activated configuration to the activated configuration, the push plate 171 can be located at a higher elevation. Also, when the actuator 100 goes from a non-activated configuration to the activated configuration, the angle between the first portion 112 and the second portion 114 of the first outer body member 110 can decrease. Similarly, when the actuator 100 goes from a non-activated configuration to the activated configuration, the angle between the first portion 132 and the second portion 134 of the second outer body member 130 can decrease. It will be appreciated that the first endcap 160 and the second endcap 170 can be configured to accommodate the movement of the first outer body member 110 and the second outer body member 130 while maintaining the operative connection to them.

It should be noted that, in some arrangements, the push plate 171 can deliver an actuation force symmetrically, that is, substantially in line with a force direction of the actuator 100 (e.g., in direction of the second dimension 210). However, in other arrangements, the actuator 100 can be configured to deliver an actuation force that is asymmetric, that is, not in line with the force direction of the actuator 100. Delivery of an asymmetric actuation force can be achieved in various ways. As an example, the first portion 112 and the second portion 114 of the first outer body member 110 can have different lengths. Thus, one of the portions is longer than the other. As a result, the push plate 171 may no longer be substantially centrally located. Alternatively or additionally, the first portion 132 and the second portion 134 of the second outer body member 130 can have different lengths. As a still further example, the push plate 171 can be configured such that the engaging surface 173 or other portion of the push plate 171 is angled relative to the first dimension 200. As yet another example, the push plate 171 can be operatively connected to the first outer body member 110 such that the push plate 171 extends from the first outer body member 110 at an acute angle. As one more example, the biasing force of the biasing members 154, 155 can be different from each other. Of course, it will be appreciated that the delivery of an asymmetric actuation force can be achieved by any combination of the above and other arrangements.

Figure 10:
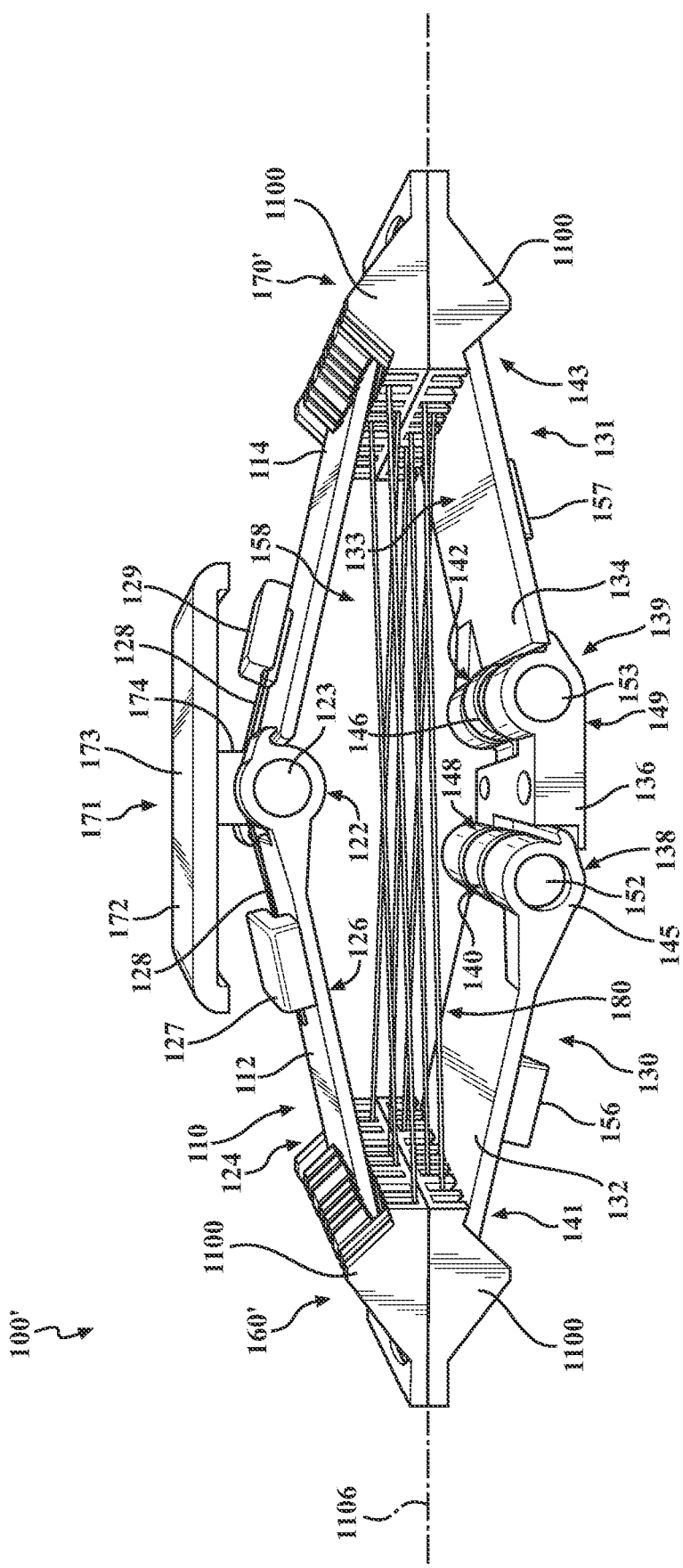
FIG. 10 is another example of an actuator.
Figure 11A:
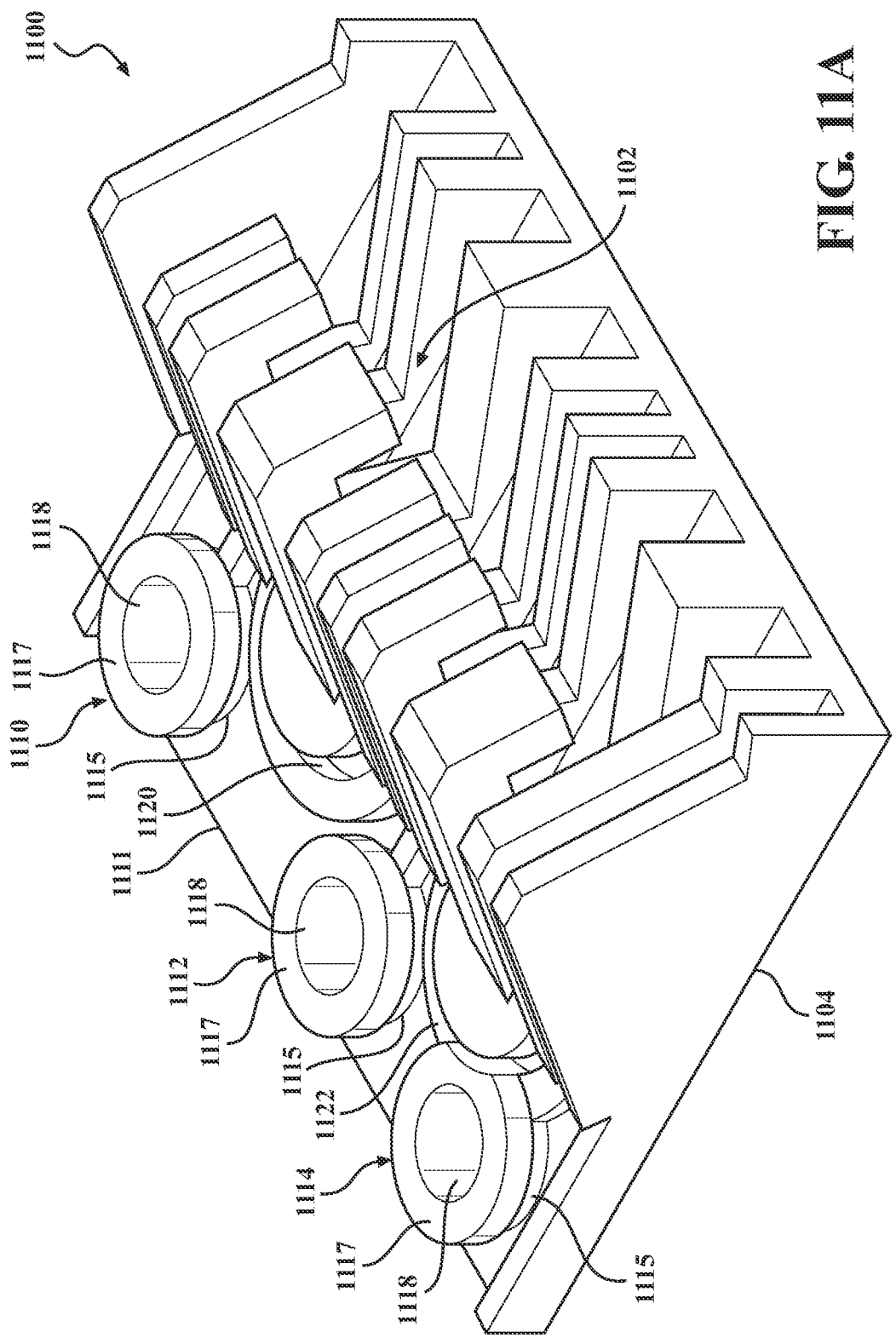
FIGS. 11A-11E show different views of an endcap portion for the actuator of FIG. 10.
Figure 11C:
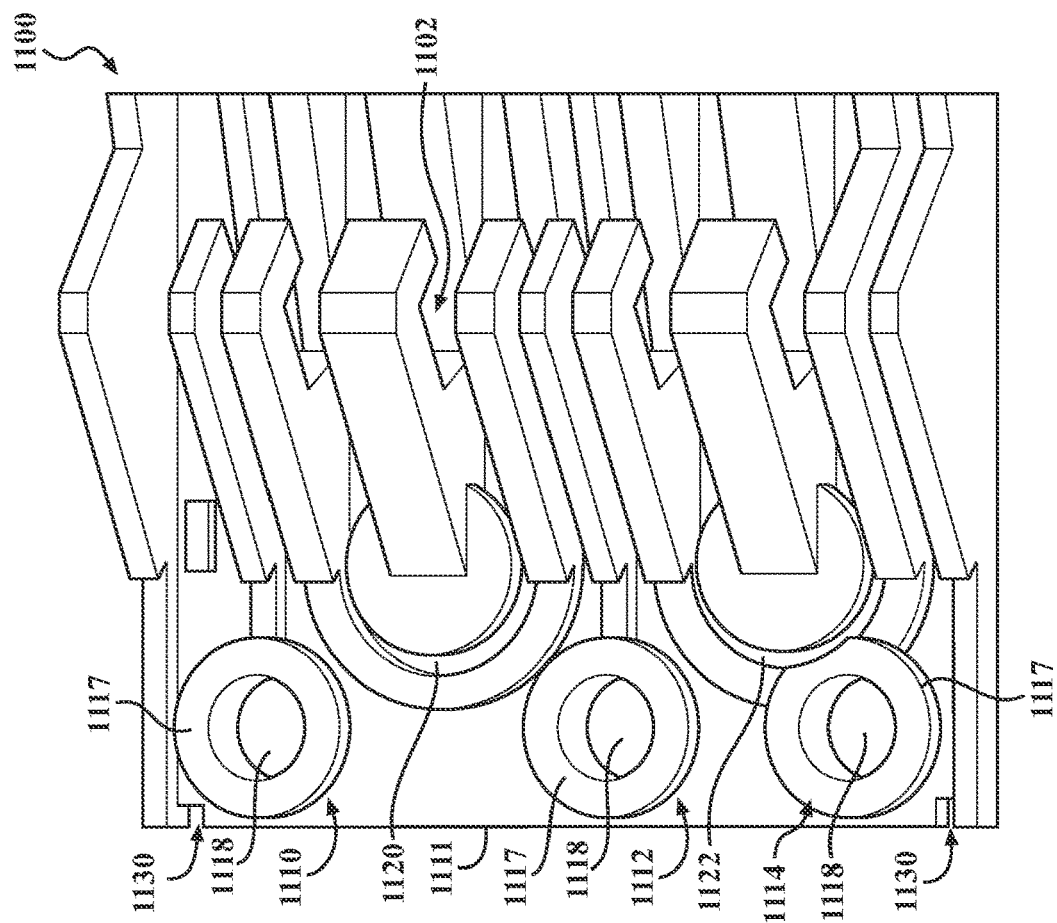
Figure 11B:
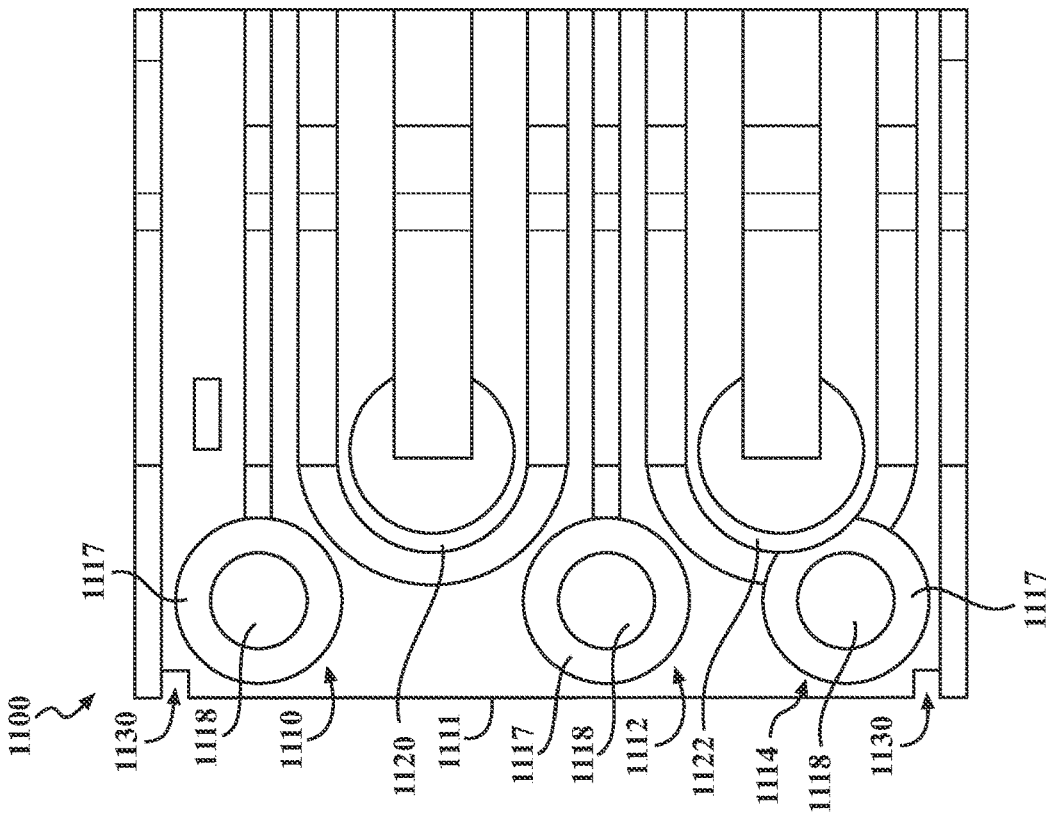
Figure 11D:
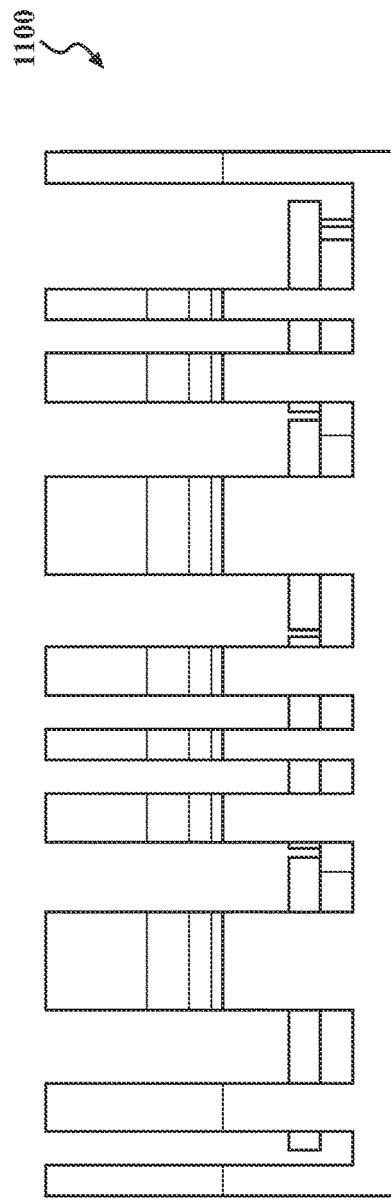
Figure 11E:
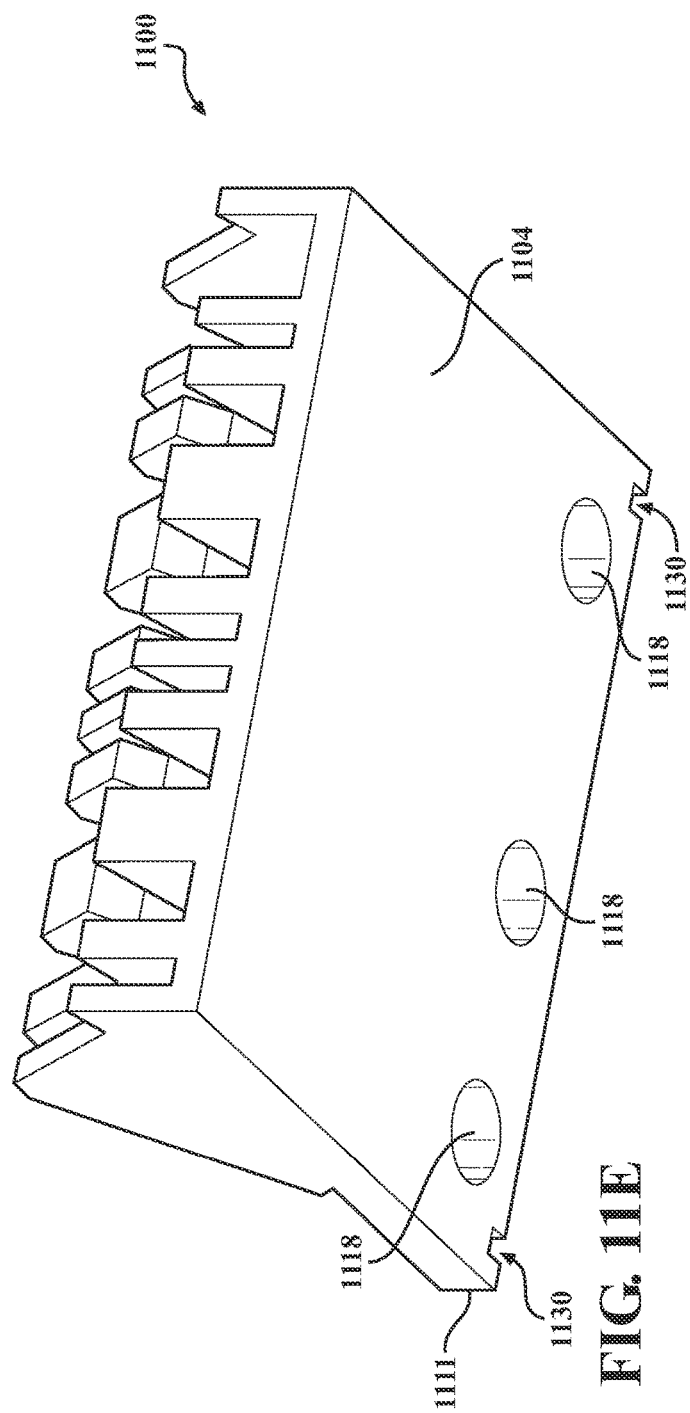
Figure 12:
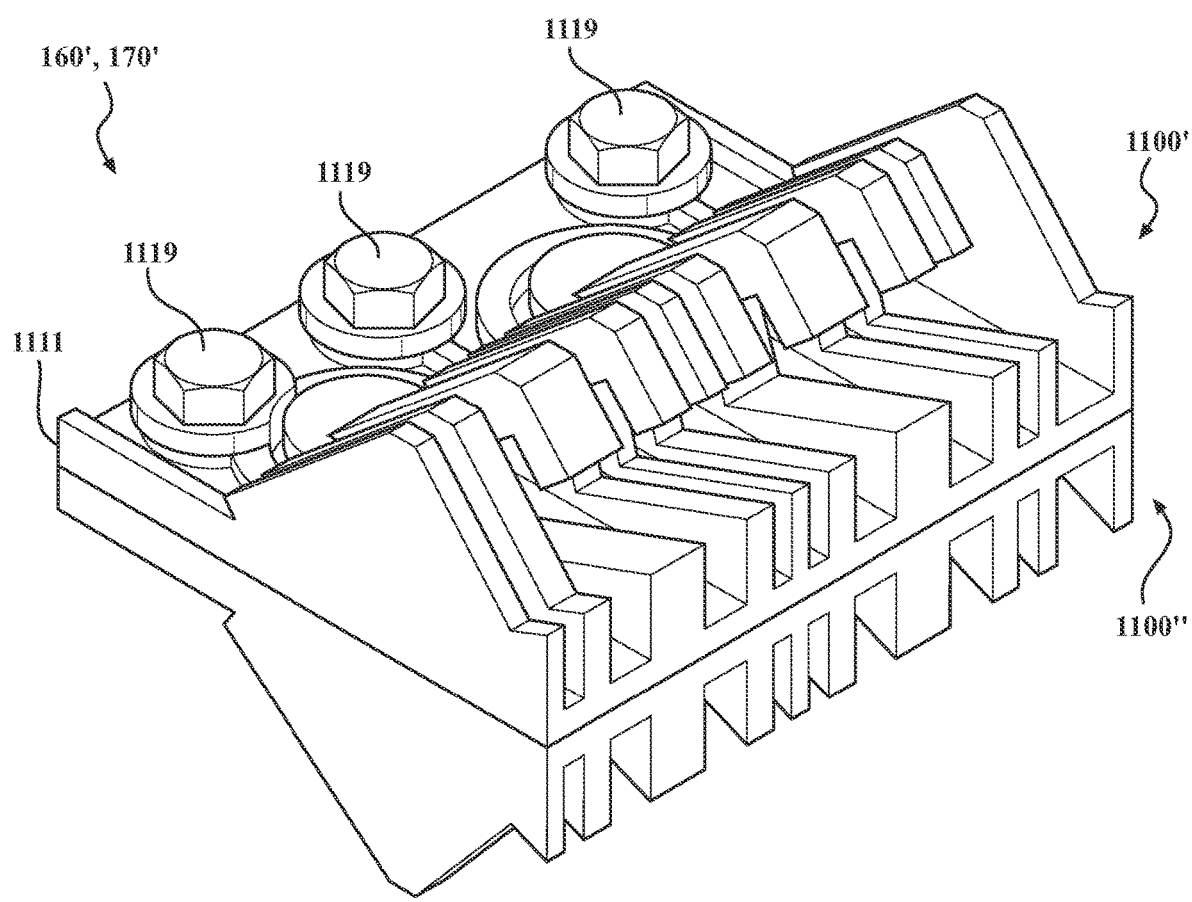
FIG. 12 is an example of an endcap for the actuator of FIG. 10, showing two endcap portions connected to each other.

Referring to FIG. 10, another example of an actuator 100' is shown. For convenience, the reference numbers used in connection with the actuator 100 in FIGS. 1-3 will be repeated here in connection with the actuator 100' of FIG. 14. The actuator 100' can include the first outer body member 110, the second outer body member 130, and the shape memory material member(s) 180. The above description of the first outer body member 110, the second outer body member 130, and the shape memory material member(s) 180 made in connection with the actuator 100 shown in FIGS. 1-3 applies equally to the same components here in connection with the actuator 100' of FIG. 14.

Figure 14:
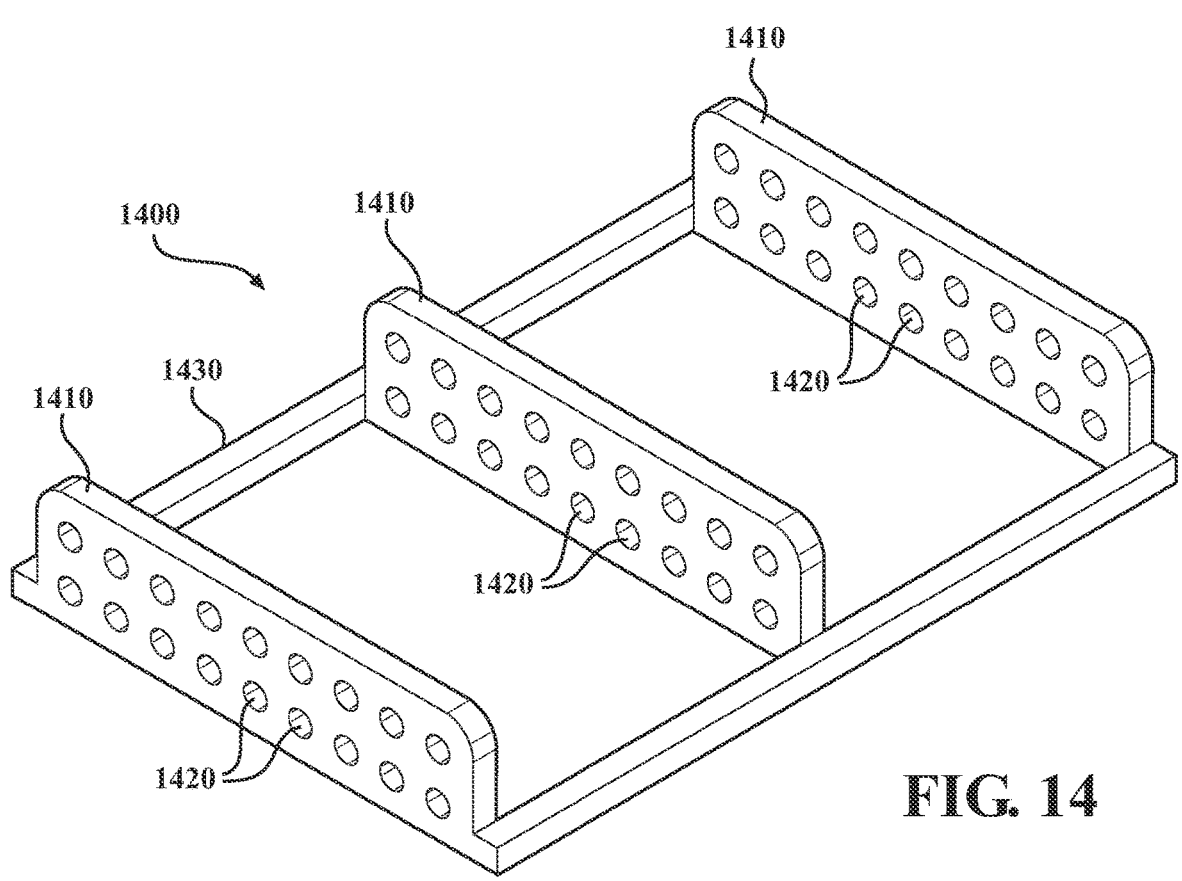
FIG. 14 is an example of a wire guide for use with the actuator of FIG. 1 or FIG. 10.

The actuator 100' includes a first endcap 160' and a second endcap 170'. The first endcap 160' and the second endcap 170' shown in FIG. 14 are different than the first endcap 160 and the second endcap 170 shown in FIGS. 5A-5F. The actuator 100' can include a first endcap 160 and a second endcap 170. The first endcap 160 and the second endcap 170 can be spaced apart. The first endcap 160 and the second endcap 170 can face toward each other. The first endcap 160 and the second endcap 170 can be substantially aligned with each other.

The first endcap 160' and the second endcap 170' can have any suitable size, shape, and/or configuration. In one or more arrangements, the first endcap 160' and the second endcap 170' can be substantially identical to each other. However, the first endcap 160' and the second endcap 170' can be oriented differently. The first endcap 160' and the second endcap 170' can be made of any suitable material, such as plastic or metal. In one or more arrangements, the first endcap 160' and the second endcap 170' can be different from each other in one or more respects.

In some arrangements, the first endcap 160' and/or the second endcap 170' can be a unitary structure. In other arrangements, the first endcap 160' and/or the second endcap 170' can be made of a plurality of portions. Referring to FIGS. 11A-11E, one example of an endcap portion 1100 of the first endcap 160' and/or the second endcap 170' is shown.

The endcap portion 1100 can be configured to engage the first outer body member 110 and the second outer body member 130. For instance, the endcap portion 1100 can include an interfacing surface 1104. The interfacing surface 1104 can be substantially planar. The endcap portion 1100 can include an engaging cavity 1102. The engaging cavity 1102 can be angled relative to the interfacing surface 1104. Alternatively or additionally, the engaging cavity 1102 can be angled relative to a plane 1106 of the first endcap 160' or the second endcap 170', as shown in FIG. 10. For instance, in one or more arrangements, the engaging cavity 1102 can be at an angle of about 20 to about 25 degrees relative to the plane 1106 and/or to the interfacing surface 1104.

The engaging cavity 1102 of the endcap portion 1100 can be configured for operative connection to the first outer body member 110 and/or the second outer body member 130. More particularly, the engaging cavity 1102 of the endcap portion 1100 can be configured for operative connection to the second interfacing end 117 of the first portion 112, the second interfacing end 119 of the second portion 114, the second interfacing end 119 of the first portion 132, and/or the second interfacing end 119 of the second portion 134.

There can be any suitable form of operative connection between the engaging cavity 1102 and the first outer body member 110 and/or the second outer body member 130. For instance, the first outer body member 110 and/or the second outer body member 130 can be operatively connected to the engaging cavity 1102 by mechanical engagement, one or more fasteners, one or more adhesives, and/or one or more brazes or weld, just to name a few possibilities. As an example, the first outer body member 110 and/or the second outer body member can include a lip 115, protrusion, or other feature that can engage with the respective endcap within the engaging cavity 1102, such as by interlocking engagement. The first outer body member 110 and/or the second outer body member 130 can be retainably engaged by the engaging cavity 1102. The engaging cavity 1102 can provide end containment for the first portion 112, the second portion 114, the first portion 132, and/or the second portion 134 to pivot in when the actuator 100 is activated or deactivated.

The endcap portion 1100 can include a plurality of features to allow for engagement with the shape memory material member(s) 180. For instance, the endcap portion 1100 can include one or more features to enable the shape memory material member(s) 180 to turn around and extend toward the opposite endcap, to enter the endcap portion 1100, and/or to exit the endcap portion 1100. For instance, endcap portion 1100 can include a plurality of posts (e.g., a first post 1110, a second post 1112, and a third post 1114) and a plurality of grooves (e.g., a first groove 1120, a second groove 1122). The endcap portion 1100 can include one or more inlet/outlet notches 1130. Further, the endcap portion 1100 can include various structures that can define a plurality of channels (e.g., a first channel 1141, a second channel 1142, a third channel 1143, a fourth channel 1144, a fifth channel 1145, a sixth channel 1146, a seventh channel 1147, an eighth channel 1148, and a ninth channel 1149).

In some arrangements, the shape memory material member(s) 180 can extend along the groove(s). The first groove 1120 and the second groove 1122 can have any suitable size, shape, and/or configuration. In some arrangements, the first groove 1120 and the second groove 1122 can be substantially identical to each other. In other arrangements, the first groove 1120 and the second groove 1122 can be different from each other in one or more respects. In one or more arrangements, the first groove 1120 and the second groove 1122 can be substantially U-shaped.

In some arrangements, the shape memory material member(s) 180 can wrap around the post(s). The post(s) can have any suitable size, shape, and/or configuration. In some arrangements, the post(s) can be substantially identical to each other. In other arrangements, the post(s) can be different from each other in one or more respects. In one or more arrangements, the post(s) can include a shaft 1115 and a cap 1117. The cap 1117 can be larger than the shaft 1115. In some arrangements, the shaft 1115 can be substantially cylindrical. The cap 1117 can be configured to help retain the shape memory material member(s) 180 on the shaft 1115. The cap 1117 can physically prevent the shape memory material member(s) 180 from slipping off of the end of the shaft 1115. An aperture 1118 can be defined in each of the post(s). The apertures 1118 can extend through the endcap portion 1100 such that openings are defined in the cap 1117 and the interfacing surface 1104.

There can be any suitable arrangement of the groove(s) and the post(s). For example, the post(s) and the groove(s) can alternate with each other. In some arrangements, the groove(s) and the post(s) can be substantially equally spaced from each other. In other arrangements, the groove(s) and the post(s) can be non-equally spaced in at least one or more areas. In some arrangements, the post(s) can be located closer to an outboard end 1111 of the endcap portion 1100 than the groove(s).

The endcap portion 1100 can include one or more inlet/outlet notches 1130. The inlet/outlet notch(es) 1130 can be provided in any suitable locations on the endcap portion 1100. For instance, the inlet/outlet notch(es) 1130 can be located outboard of the groove(s) and the post(s). The inlet/outlet notch(es) 1130 can provide an entry or exit point for the shape memory material member(s) 180 from the endcap portion 1100. When exiting the endcap portion 1100, the shape memory material member(s) 180 can extend to another endcap portion 1100, to a portion of an exterior of the endcap 160', 170', or to some other structure.

A plurality of endcap portions 1100 can be joined to form an endcap (e.g., endcap 160' or endcap 170'). For instance, a first endcap portion 1100' and a second endcap portion 1100" can be joined together to form the endcap 160', 170'. In one or more arrangements, the first endcap portion 1100' and the second endcap portion 1100" can be substantially identical to each other. In one or more arrangements, the first endcap portion 1100' and the second endcap portion 1100" can be substantially mirror images of each other. In one or more arrangements, the first endcap portion 1100' and the second endcap portion 1100" can be different from each other in one or more respects. While this example shows two endcap portions, it will be appreciated that there can be more than two endcap portions.

When the first and second endcap portions 1100', 1100" are joined, the interfacing surface 1104 of the first endcap portion 1100' and the interfacing surface 1104 of the second endcap portion 1100" can directly contact each other. The first and second endcap portions 1100', 1100" can be joined in any suitable manner, now known or later developed. For instance, the first and second endcap portions 1100', 1100" can be joined by one or more fasteners, one or more adhesives, one or more forms of mechanical engagement, one or more other forms of connection, and/or any combination thereof. In the example shown in FIG. 12, the first and second endcap portions 1100', 1100" can be joined by a plurality of bolts 1119, which can extend through the endcap portion 1100. In one or more arrangements, the head of the bolt 1119 can engage the cap 1117 of the respective post. The bolt 1119 can extend through the aperture 1118 in the first endcap portion 1100'. The bolt 1119 can extend through the aperture 1118 in the second endcap portion 1100". A distal end of the bolt can pass outside of the cap 1117 of the second endcap portion 1100". The distal end of the bolt 1119 can be engaged a retaining member, such as a nut or other retaining structure. It will be appreciated that, in some arrangements, the endcap 160' and/or 170' can be unitary structures made of a single piece, such as by three-dimensional printing or injection molding.

The shape memory material members(s) 180 can extend between the first endcap 160' and the second endcap 170' in any suitable manner. One non-limiting example of the routing of the shape memory material members(s) 180 will now be described in connection with one of the endcap portions 1100 in FIG. 13.

Figure 13:
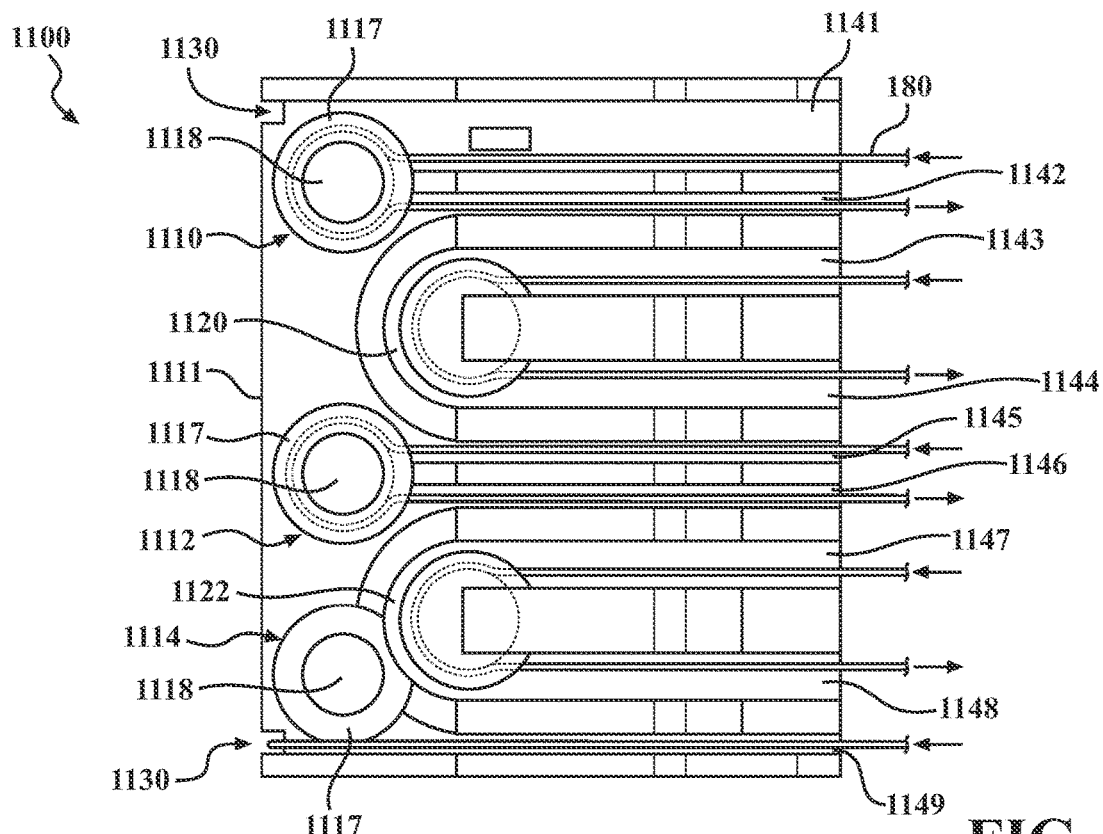
FIG. 13 is an example way of routing of a shape memory material member on the endcap shown in FIGS. 10-12.

Beginning near the top of the page in FIG. 13, the shape memory material member 180 can enter the first channel 1141. For example, the shape memory material member 180 can be coming from the opposite endcap (either substantially horizontally across the cavity 158 or diagonally across the cavity 158). The shape memory material member 180 can extend along the first channel 1141 to the first post 1110. The shape memory material member 180 can wrap around the first post 1110 so as to turn around and enter the second channel 1142. The shape memory material member 180 can be retained on the first post 1110 by the cap 1117.

The shape memory material member 180 can extend along the second channel 1142. The shape memory material member 180 can extend back across the cavity 158 and into engagement with the opposite endcap. The shape memory material member 180 can turn around in the opposite endcap, extend back across the cavity 158, and enter the third channel 1143. The shape memory material member 180 can extend along the third channel 1143 to the first groove 1120. The shape memory material member 180 can wrap around the first groove 1120 so as to turn around and enter the fourth channel 1144. The shape memory material member 180 can extend back across the cavity 158 and into engagement with the opposite endcap. The shape memory material member 180 can turn around in the opposite endcap and extend back across the cavity 158. The routing of the shape memory material member 180 can continue in the same manner with respect to the fifth channel 1145, the second post 1112, and the sixth channel 1146. The shape memory material member 180 can extend back across the cavity 158 and into engagement with the opposite endcap. The shape memory material member 180 can turn around in the opposite endcap and extend back across the cavity 158. The routing of the shape memory material member 180 can continue in the same manner with respect to the seventh channel 1147, the second groove 1122, and the eighth channel 1148.

The shape memory material member 180 can extend back across the cavity 158 and into engagement with the opposite endcap. The shape memory material member 180 can turn around in the opposite endcap and extend back across the cavity 158. The shape memory material member 180 can enter the ninth channel 1149. The shape memory material member 180 can extend along the ninth channel. The shape memory material member 180 can exit the endcap portion 1100 through the inlet/outlet notch 1130. From there, the shape memory material member 180 can extend to a point external to the endcap, to an attachment point on the endcap, to the other endcap portion to which the endcap portion shown in FIG. 13 is attached (e.g., by entering the inlet/outlet notch 1130 on the other endcap portion). In some arrangements, the shape memory material member 180 can wrap around the third post 1114 prior to exiting the endcap portion 1100 through the inlet/outlet notch 1130.

It will be understood that other arrangements of the shape memory material member 180 are possible and that the routing shown in FIG. 13 is merely one example. It should be noted that, when extending across the cavity 158, the shape memory material members(s) 180 can extend substantially straight across from one endcap to the other endcap. In such case, the shape memory material members(s) 180 can extend substantially parallel to the plane 1106. Alternatively, the shape memory material members(s) 180 can extend from the upper or lower side of one of the endcaps to the opposite one of the upper or lower side of the other endcap. Thus, the shape memory material members(s) 180 can extend substantially diagonally across the cavity 158. In some arrangements, the shape memory material members(s) 180 can be wrapped around one or more of the post(s) a plurality of times. For instance, in one or more arrangements, the shape memory material members(s) 180 can be wrapped twice around the post(s). In some arrangements, the shape memory material members(s) 180 can be wrapped around one or more of the groove(s) a plurality of times. Such wrapping of the shape memory material members(s) 180 can increase the actuation force imparted by the shape memory material members(s) 180 when activated.

In some arrangements, the endcaps 160', 170' or the endcap portions 1100 can be configured to provide a connection point for an end of the shape memory material member(s) 180. For instance, in one or more arrangements, the endcaps 160', 170' or the endcap portions 1100 can include a flange. The flange can provide a connection point for an end of the shape memory material member(s) 180. In this location, the shape memory material member(s) 180 can operatively connected to another conductor or other element to a power source. In some instance, the shape memory material member(s) 180 can be operatively connected to the flange, such as by one or more fasteners, one or more adhesives, one or more forms of mechanical engagement, one or more other forms of connection, and/or any combination thereof.

In some arrangements, the shape memory material member(s) 180 are bare, that is, they are not coated or covered with an insulating material. In some arrangements, at least a portion of the shape memory material member(s) 180 can be coated or covered with an insulating material. For instance, the portions of the shape memory material member(s) 180 that interact with the groove(s) and/or the post(s) can be coated or covered with an insulating material 167. In some arrangements, the insulating material can be a sleeve or a wrap.

It should be noted that, in at least some arrangements, the above-described actuators can use a wire guide to facilitate routing of the shape memory material member(s) 180. FIG. 14 is an example of a wire guide 1400. The wire guide 1400 can include a plurality of panels 1410. In each of the panels 1410, a plurality of apertures 1420 can be defined. The apertures 1420 can be sized, shaped, and/or configured to allow passage of the shape memory material member(s) 180 as they are routed between the endcaps 160, 170, 160', 170'. The plurality of panels 1410 can be spaced apart from each other. In some arrangements, the panels 1410 can be substantially equally spaced from each other. In other arrangements, the panels 1410 can be non-equally spaced from the each other. The panels 1410 can be connected to one or more frame members 1430. The wire guide 1400 can be made of any suitable material, such as one that does not interact with the shape memory material member(s) 180.

Figure 4:
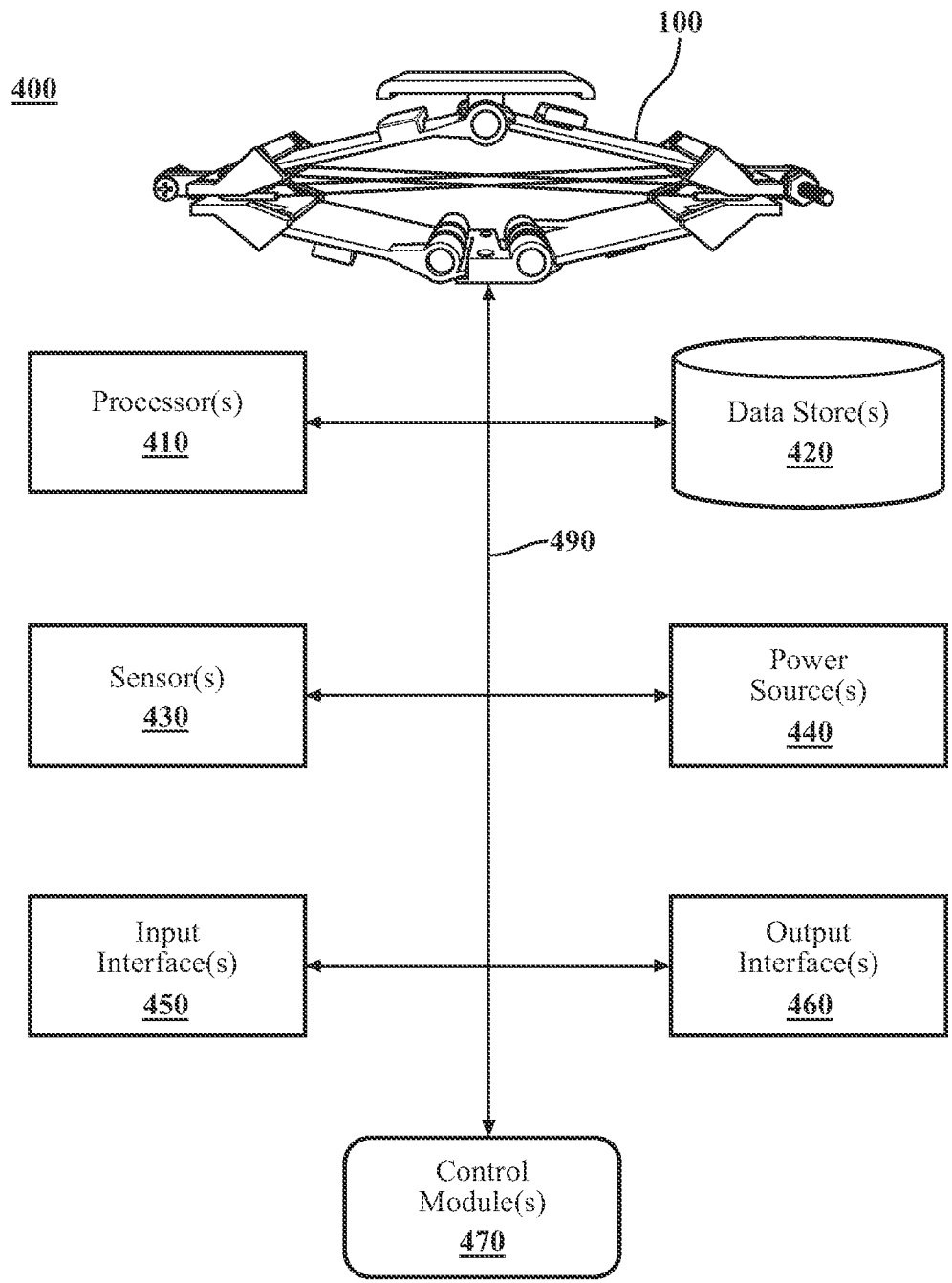
FIG. 4 is an example of a system including the actuator of FIG. 1.

FIG. 4 shows an example of a system 400. The system 400 can include various elements. Some of the possible elements of the system 400 are shown in FIG. 4 and will now be described. It will be understood that it is not necessary for the system 400 to have all of the elements shown in FIG. 4 or described herein. The system 400 can have any combination of the various elements shown in FIG. 4. Further, the system 400 can have additional elements to those shown in FIG. 4. In some arrangements, the system 400 may not include one or more of the elements shown in FIG. 4. Further, in some arrangements, the various elements may be located on or within a chair, but it will be understood that one or more of these elements can be located external to the chair. Further, the elements shown may be physically separated by large distances.

The system 400 can include one or more of the actuators 100 as described above. The actuators 100 can be operatively connected to one or more of the elements of the system 400.

The system 400 can include one or more processors 410, one or more data stores 420, one or more sensors 430, one or more power sources 440, one or more input interfaces 450, one or more output interfaces 460, one or more of the actuators 100, and one or more control modules 470. Each of these elements will be described in turn below.

As noted above, the system 400 can include one or more processors 410. "Processor" means any component or group of components that are configured to execute any of the processes described herein or any form of instructions to carry out such processes or cause such processes to be performed. The processor(s) 410 may be implemented with one or more general-purpose and/or one or more specialpurpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 410 can include at least one hardware circuit (e.g., an integrated circuit) configured to carry out instructions contained in program code. In arrangements in which there is a plurality of processors 410, such processors can work independently from each other, or one or more processors can work in combination with each other.

The system 400 can include one or more data stores 420 for storing one or more types of data. The data store(s) 420 can include volatile and/or non-volatile memory. Examples of suitable data stores 420 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 420 can be a component of the processor(s) 410, or the data store(s) 420 can be operatively connected to the processor(s) 410 for use thereby. The term "operatively connected," as used throughout this description, can include direct or indirect connections, including connections without direct physical contact.

The system 400 can include one or more sensors 430. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 400 includes a plurality of sensors 430, the sensors can work independently from each other. Alternatively, two or more of the sensors can work in combination with each other. In such case, the two or more sensors can form a sensor network. The sensor(s) 430 can be operatively connected to the processor(s) 410, the data store(s) 420, and/or other elements of the system 400 (including any of the elements shown in FIG. 1).

As noted above, the system 400 can include one or more power sources 440. The power source(s) 440 can be any power source capable of and/or configured to energize the shape memory material member(s) 180 of the actuator 100. For example, the power source(s) 440 can include one or more batteries, one or more fuel cells, one or more generators, one or more alternators, one or more solar cells, and combinations thereof.

The system 400 can include one or more input interfaces 450. An "input interface" includes any device, component, system, element or arrangement or groups thereof that enable information/data to be entered into a machine. The input interface(s) 450 can receive an input from a user (e.g., a chair occupant). Any suitable input interface 450 can be used, including, for example, a keypad, display, touch screen, multi-touch screen, button, joystick, mouse, trackball, microphone and/or combinations thereof.

The system 400 can include one or more output interfaces 460. An "output interface" includes any device, component, system, element or arrangement or groups thereof that enable information/data to be presented to a user (e.g., a chair occupant). The output interface(s) 460 can present information/data to a user (e.g., a chair occupant). The output interface(s) 460 can include a display, an earphone, and/or speaker. Some components of the system 400 may serve as both a component of the input interface(s) 450 and a component of the output interface(s) 460.

The system 400 can include one or more modules, at least some of which will be described herein. The modules can be implemented as computer readable program code that, when executed by a processor, implement one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively or in addition, one or more data stores 420 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 400 can include one or more control modules 470. The control module(s) 470 can be configured to receive signals, data, information, and/or other inputs from one or more elements of the system 400. The control module(s) 470 can be configured to analyze these signals, data, information, and/or other inputs. The control module(s) 470 can be configured to select one or more of the actuator(s) 100 to be activated or deactivated to achieve a desired effect. In some arrangements, the control module(s) 470 can be configured to select a predefined actuation profile from the data store(s) 420 to effectuate a desired actuation. Alternatively or additionally, the control module(s) 470 can be configured to detect user inputs (e.g., commands) provided on the input interface(s) 450. The control module(s) 470 can be configured to send control signals or commands over a communication network 490 to one or more elements of the system 400, including the actuator(s) 100, the shape memory material member(s) 180, and/or any portion thereof.

The control module(s) 470 can be configured to cause the selected one or more of the actuator(s) 100 to be activated or deactivated by activating or deactivating the respective shape memory material member(s) 180 associated with the selected actuator(s) 100. As used herein, "cause" or "causing" means to make, force, compel, direct, command, instruct, and/or enable an event or action to occur or at least be in a state where such event or action may occur, either in a direct or indirect manner. The control module(s) 470 can selectively provide an activation input to the actuator(s) 100 or, more particularly, to the shape memory material member(s) 180 associated with the selected actuator(s) 100. The control module(s) 470 can selectively permit or prevent the flow of electrical energy from the power source(s) 440.

The various elements of the system 400 can be communicatively linked to one another or one or more other elements through one or more communication networks 490. As used herein, the term "communicatively linked" can include direct or indirect connections through a communication channel, bus, pathway or another component or system. A "communication network" means one or more components designed to transmit and/or receive information from one source to another. The data store(s) 420 and/or one or more other elements of the system 400 can include and/or execute suitable communication software, which enables the various elements to communicate with each other through the communication network and perform the functions disclosed herein.

The one or more communication networks 490 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

It will be appreciated that arrangements described herein can provide numerous benefits, including one or more of the benefits mentioned herein. For example, arrangements described herein can provide an actuator that can provide sufficient actuation force for numerous applications. Arrangements described herein can use less shape memory material members than in other actuator designs. Arrangements described herein can a reduced actuator footprint compared to at least some other shape memory alloy-based actuator designs. Arrangements described herein can use less power to activate because the shape memory material members do not have to fight against thick and heavy actuator body members as in prior actuator designs. Arrangements described herein can result in a lower cost actuator. Arrangements described herein can decouple the strength of the first and second body members from the tension in these body members. Arrangements described herein can allow for focusing of the actuation force by providing push plates of different sizes, shapes, and/or configurations. Arrangements described herein avoid large amounts of shape memory material member(s) located external to the actuator, which could create an unsightly appearance and make integration into different components challenging.

Arrangements described herein can be used in various applications in which a force is imparted on another structure or person. In some arrangements, arrangements described herein can be used in connection with a vehicle. For instance, arrangements described herein can be used in connection with a vehicle seat to provide a haptic or massaging effect to an occupant of the vehicle seat. As another example, arrangements described herein can be used to adjust the position of a vehicle component. Further, it will be appreciated that arrangements described herein can be used in connection with various non-vehicular applications, such as chairs, office chairs, massage chairs, beds, etc. Still further, arrangements described herein can be used in connection with massaging devices.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. An actuator, comprising:
    a first outer body member including a first portion and a second portion pivotably connected to each other, the first outer body member including a first end and a second end;
    a second outer body member including a first end and a second end;
    a first endcap;
    a second endcap positioned opposite the first endcap, the first end of the first outer body member and the first end of the second outer body member being operatively connected to and separated from each other by the first endcap, the second end of the first outer body member and the second end of the second outer body member being operatively connected to and separated from each other by the second endcap; and
    a shape memory material member operatively connected to the first endcap and the second endcap,
    when an activation input is provided to the shape memory material member, the shape memory material member contracts, thereby causing the actuator to move in a direction that is different from a direction of contraction.

2. An actuator, comprising:
    a first outer body member including a first portion and a second portion operatively connected to each other such that the first portion and the second portion are movable relative to each other, the first outer body member including a first end and a second end;
    a second outer body member including a first end and a second end;
    a first endcap;
    a second endcap positioned opposite the first endcap, the first end of the first outer body member and the first end of the second outer body member being operatively connected to and separated from each other by the first endcap, the second end of the first outer body member and the second end of the second outer body member being operatively connected to and separated from each other by the second endcap; and
    a shape memory material member operatively connected to the first endcap and the second endcap,
    when an activation input is provided to the shape memory material member, the shape memory material member contracts, thereby causing the actuator to morph into an activated configuration in which a height of the actuator increases.

3. The actuator of claim 2, wherein the first portion and the second portion of the first outer body member are pivotably connected to each other by a hinge.

4. The actuator of claim 2, further including a biasing member operatively positioned to bias the first outer body member into a non-activated configuration of the actuator.

5. The actuator of claim 2, further including a push plate operatively connected to the first outer body member, and wherein, when the actuator morphs from a non-activated configuration to the activated configuration, a position of the push plate changes.

6. The actuator of claim 5, wherein the push plate includes an engaging surface, and wherein the engaging surface has a substantially polygonal shape.

7. The actuator of claim 2, wherein the second outer body member includes a first portion and a second portion, and wherein each of the first portion and the second portion of the second outer body member is pivotably connected to a base structure.

8. The actuator of claim 7, further including a biasing member operatively positioned to bias the first portion and the second portion of the second outer body member into a non-activated configuration.

9. The actuator of claim 2, wherein the shape memory material member is arranged in a serpentine or non-linear pattern.

10. The actuator of claim 2, wherein the shape memory material member includes a one or more shape memory alloy wires.

11. A system comprising:
    an actuator including:
        a first outer body member including a first portion and a second portion operatively connected to each other, the first outer body member including a first end and a second end;
        a second outer body member including a first end and a second end;
        a first endcap;
        a second endcap positioned opposite the first endcap, the first end of the first outer body member and the first end of the second outer body member being operatively connected to and separated from each other by the first endcap, the second end of the first outer body member and the second end of the second outer body member being operatively connected to and separated from each other by the second endcap; and
        a shape memory material member operatively connected to the first endcap and the second endcap; and
    a processor operatively connected to selectively activate the shape memory material member,
    when an activation input is provided to the shape memory material member, the shape memory material member contracts, thereby causing the actuator to morph into an activated configuration in which a height of the actuator increases.

12. The system of claim 11, further including:
one or more power sources operatively connected to supply electrical energy to the shape memory material member, wherein the processor is operatively connected to the one or more power sources, wherein the processor is configured to selectively control a supply of electrical energy to the shape memory material member.

13. The system of claim 11, wherein the processor is configured to:
activate the shape memory material member to cause the shape memory material member to contract, thereby causing the actuator to morph into the activated configuration.

14. The system of claim 11, wherein the first portion and the second portion of the first outer body member are pivotably connected to each other by a hinge.

15. The system of claim 14, wherein the actuator further includes a biasing member operatively positioned to bias the first outer body member into a non-activated configuration of the actuator.

16. The system of claim 11, wherein the actuator further includes a push plate operatively connected to the first outer body member, and wherein, when the actuator morphs from a non-activated configuration to the activated configuration, the push plate is located at a higher elevation.

17. The system of claim 11, wherein the second outer body member includes a first portion and a second portion, and wherein each of the first portion and the second portion of the second outer body member is pivotably connected to a base structure.

18. The system of claim 17, further including a biasing member operatively positioned to bias the first portion and the second portion of the second outer body member into a non-activated configuration.

19. The system of claim 11, wherein the shape memory material member includes a shape memory alloy wire.

20. An actuator, comprising:
a first outer body member including a first portion and a second portion pivotably connected by a hinge;
a first biasing member operatively positioned to bias the first outer body member into a non-activated configuration;
a push plate operatively connected to the first outer body member;
a second outer body member including a first portion, a second portion, and a base, each of the first portion and the second portion being pivotably connected to the base;
a second biasing member operatively positioned to bias the first portion and the second portion of the second outer body member into the non-activated configuration, the first biasing member does not contact the second outer body member;
a shape memory alloy wire;
a first endcap; and
a second endcap positioned opposite the first endcap, the shape memory alloy wire being operatively connected to the first and second endcaps,
when an activation input is provided to the shape memory alloy wire, the shape memory alloy wire contracts, thereby causing the actuator to morph into an activated configuration in which a height of the actuator increases.

21. An actuator, comprising:
a first outer body member including a first portion and a second portion operatively connected to each other such that the first portion and the second portion are movable relative to each other;
a second outer body member;
a shape memory material member;
a biasing member operatively positioned to bias the first outer body member into a non-activated configuration, the biasing member does not contact the second outer body member; and
a push plate operatively connected to the first outer body member,
when an activation input is provided to the shape memory material member, the shape memory material member contracts, thereby causing the actuator to morph into an activated configuration in which a height of the actuator increases and a position of the push plate changes.

22. An actuator, comprising:
a first outer body member including a first portion and a second portion operatively connected to each other such that the first portion and the second portion are movable relative to each other;
a second outer body member;
a shape memory material member arranged in a non-linear or serpentine pattern; and
a biasing member operatively positioned to bias the first outer body member into a non-activated configuration, the biasing member does not contact the second outer body member,
when an activation input is provided to the shape memory material member, the shape memory material member contracts, thereby causing the actuator to morph into an activated configuration in which a height of the actuator increases.

23. An actuator, comprising:
a first outer body member including a first portion and a second portion operatively connected to each other such that the first portion and the second portion are movable relative to each other;
a second outer body member;
a shape memory material member arranged in a non-linear or serpentine pattern;
a push plate operatively connected to the first outer body member;
a first endcap; and
a second endcap, the first and second endcaps separating the first outer body member and the second outer body member from each other,
when an activation input is provided to the shape memory material member, the shape memory material members contract, thereby causing the actuator to morph into an activated configuration in which a height of the actuator increases and a position of the push plate changes.

24. An actuator, comprising:
a first outer body member including a first portion and a second portion operatively connected to each other such that the first portion and the second portion are movable relative to each other;
a second outer body member;
shape memory material members extends in a space between the first and second outer body members;
a first endcap; and
a second endcap, the first and second endcaps separating the first outer body member and the second outer body member from each other,
when an activation input is provided to the shape memory material member, the shape memory material member contracts, thereby causing the actuator to morph into an activated configuration in which a height of the actuator increases.

25. A system comprising:
an actuator including:
- a first outer body member including a first portion and a second portion operatively connected to each other such that the first portion and the second portion are movable relative to each other;
- a second outer body member; and
- a shape memory material member arranged in a non-linear or serpentine pattern;

a processor operatively connected to selectively activate the shape memory material member, when an activation input is provided to the shape memory material member, the shape memory material member contracts, thereby causing the actuator to morph into an activated configuration in which a height of the actuator increases; and a biasing member operatively positioned to bias the first outer body member into a non-activated configuration, the biasing member does not contact the second outer body member.

* * * * *